United States Patent
Mizui et al.

(10) Patent No.: US 12,354,389 B2
(45) Date of Patent: Jul. 8, 2025

(54) INDIVIDUAL OBJECT IDENTIFICATION SYSTEM, INDIVIDUAL OBJECT IDENTIFICATION PROGRAM, AND RECORDING MEDIUM

(71) Applicant: DENSO CORPORATION, Kariya (JP)

(72) Inventors: Tatsuya Mizui, Kariya (JP); Futoshi Sunose, Kariya (JP); Fumihito Terai, Kariya (JP); Yuichi Yoshida, Tokyo (JP); Mitsuru Ambai, Tokyo (JP)

(73) Assignee: DENSO CORPORATION, Kariya (JP)

( * ) Notice: Subject to any disclaimer, the term of this patent is extended or adjusted under 35 U.S.C. 154(b) by 348 days.

(21) Appl. No.: 17/975,775

(22) Filed: Oct. 28, 2022

(65) Prior Publication Data

US 2023/0049798 A1 Feb. 16, 2023

Related U.S. Application Data

(63) Continuation of application No. PCT/JP2021/015596, filed on Apr. 15, 2021.

(30) Foreign Application Priority Data

Apr. 30, 2020 (JP) ................................. 2020-080319

(51) Int. Cl.
*G06K 9/00* (2022.01)
*G06V 10/42* (2022.01)
(Continued)

(52) U.S. Cl.
CPC .............. *G06V 20/80* (2022.01); *G06V 10/42* (2022.01); *G06V 10/44* (2022.01); *G06V 10/751* (2022.01)

(58) Field of Classification Search
CPC ........ G06V 20/80; G06V 10/42; G06V 10/44; G06V 10/751
See application file for complete search history.

(56) References Cited

U.S. PATENT DOCUMENTS 10,810,460 B2 * 10/2020 Ngo Dinh ............. G06F 18/217
11,210,495 B2 * 12/2021 Sharma ................. H04L 9/3278
(Continued)

FOREIGN PATENT DOCUMENTS

CN 103295245 A 9/2013
CN 108229369 A 6/2018
(Continued)

OTHER PUBLICATIONS

Image Retrieval From the World Wide Web: Issues, Techniques, and Systems, M. L. Kherfi et al., acm, 2004, pp. 35-67 (Year: 2004).*

Primary Examiner — Jayesh A Patel
(74) Attorney, Agent, or Firm — Harness, Dickey & Pierce, P.L.C.

(57) ABSTRACT

An individual object identification system includes: an image acquisition processor configured to perform an image acquisition process to acquire an image of a subject acquired using imaging equipment; a feature point extraction processor that extracts a feature point from the image; a local feature amount calculation processor that calculates a local feature amount of the feature point; a local feature amount group classification processor that performs classification into a predetermined number of local feature amount groups; a global feature amount calculation processor that calculates a global feature amount based on each of the local feature amount groups; a searching target image registration processor that registers a plurality of images that are searching targets; a global feature amount registration processor that registers the global feature amount related to each of the registered images in a global feature amount registration unit; a narrowing processor that narrows down the plurality of registered images to registered images each having the global feature amount highly correlated with a global feature amount of an identification image; and a determination processor that compares the registered images as candidates (Continued)

with the identification image to determine the registered image having the largest number of corresponding points.

5 Claims, 15 Drawing Sheets

(51) Int. Cl.
*G06V 10/44* (2022.01)
*G06V 10/75* (2022.01)
*G06V 20/80* (2022.01)

(56) References Cited

U.S. PATENT DOCUMENTS

| | | | |
|---|---|---|---|
| 2011/0103694 A1* | 5/2011 | Nakano | G06V 40/172 382/190 |
| 2012/0114198 A1 | 5/2012 | Yang et al. | |
| 2012/0219212 A1 | 8/2012 | Anbai et al. | |
| 2012/0288148 A1* | 11/2012 | Suzuki | G06V 40/171 382/103 |
| 2013/0223737 A1 | 8/2013 | Anbai et al. | |
| 2015/0146991 A1* | 5/2015 | Nakano | G06V 40/172 382/219 |
| 2015/0213328 A1 | 7/2015 | Mase | |
| 2016/0012594 A1* | 1/2016 | Romanik | G06V 10/757 382/203 |
| 2016/0267359 A1 | 9/2016 | Gan et al. | |
| 2018/0039276 A1* | 2/2018 | Keivan | G01C 21/20 |
| 2019/0080165 A1* | 3/2019 | Takahashi | G06F 18/253 |
| 2020/0019810 A1* | 1/2020 | Takahashi | G06T 7/00 |
| 2020/0134800 A1* | 4/2020 | Hu | G06V 10/25 |
| 2021/0090289 A1* | 3/2021 | Karanam | G06T 7/337 |
| 2021/0319236 A1* | 10/2021 | Tang | G05D 1/243 |
| 2022/0044059 A1* | 2/2022 | Takahashi | G06V 10/751 |

FOREIGN PATENT DOCUMENTS

| | | | | |
|---|---|---|---|---|
| EP | 2631845 A1 | | 8/2013 | |
| JP | 2012-103758 A | | 5/2012 | |
| JP | 2012-160047 A | | 8/2012 | |
| JP | 2012-181566 A | | 9/2012 | |
| JP | 2013-186478 A | | 9/2013 | |
| JP | 2014-178857 A | | 9/2014 | |
| JP | 2015-111339 A | | 6/2015 | |
| JP | 2020046872 A | * | 3/2020 | |
| TW | 201419169 A | | 5/2014 | |
| TW | I439951 B | | 6/2014 | |
| TW | I537841 B | | 6/2016 | |
| WO | WO-2011086803 A1 | * | 7/2011 | G06K 9/00208 |
| WO | WO-2020065798 A1 | * | 4/2020 | G06K 9/46 |

* cited by examiner

FIG.13A
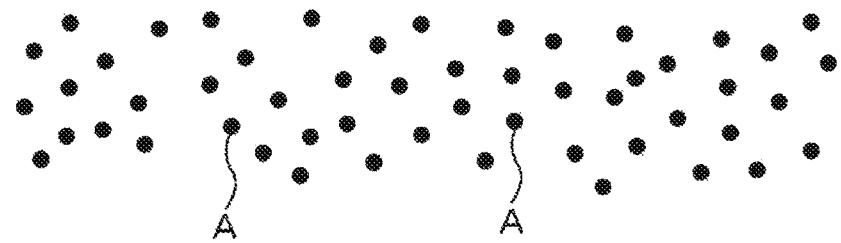
FIG.13B
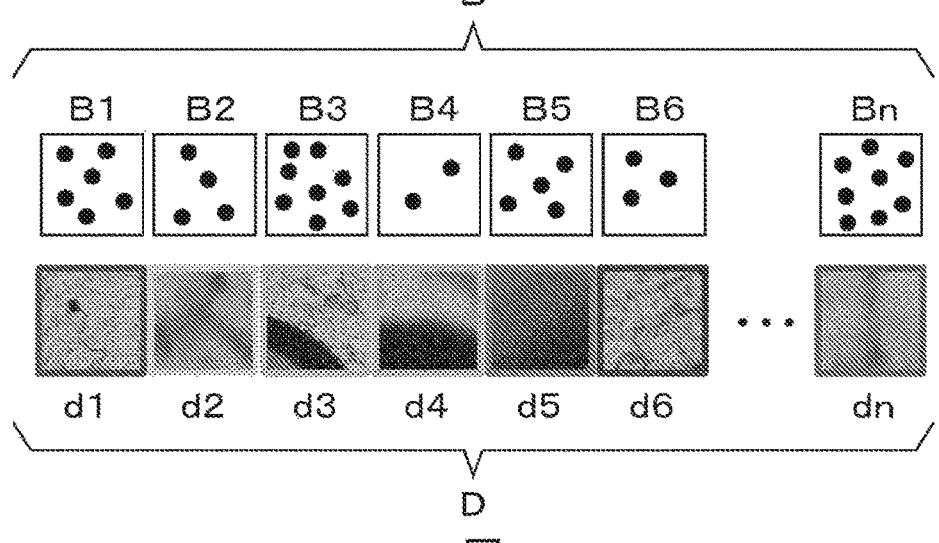
FIG.13C
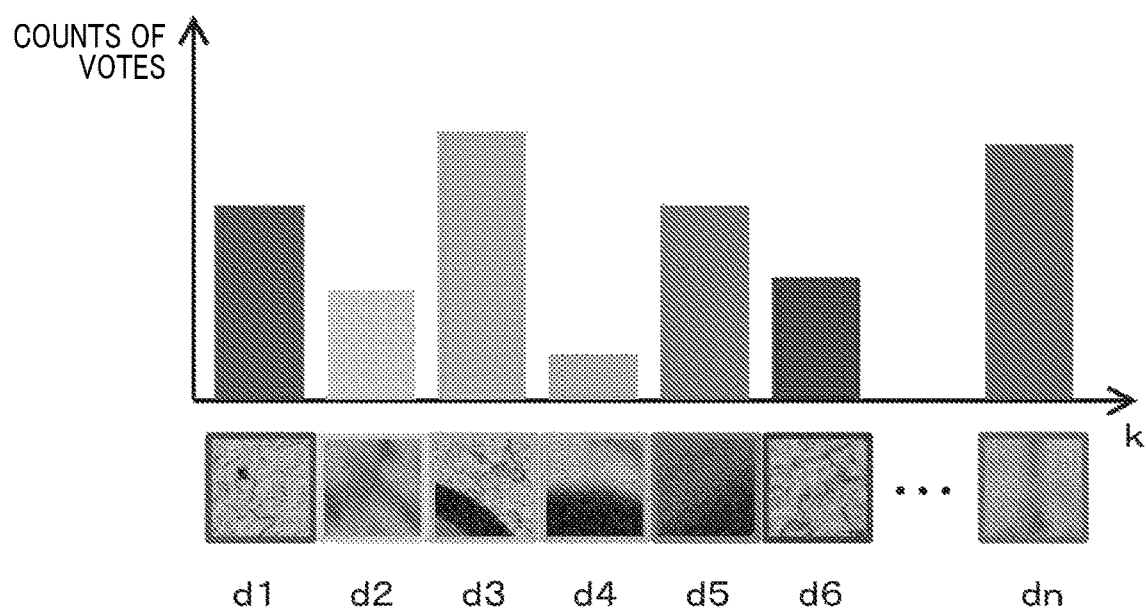

FIG.14A
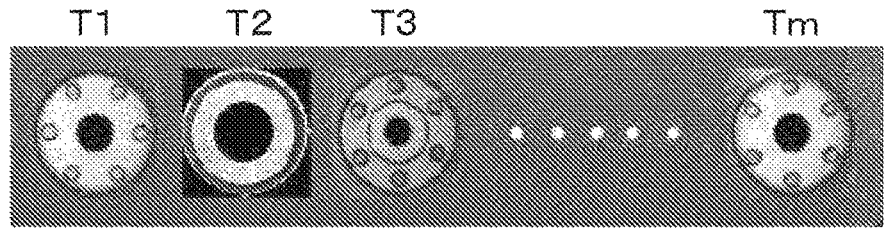
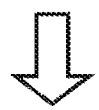
FIG.14B
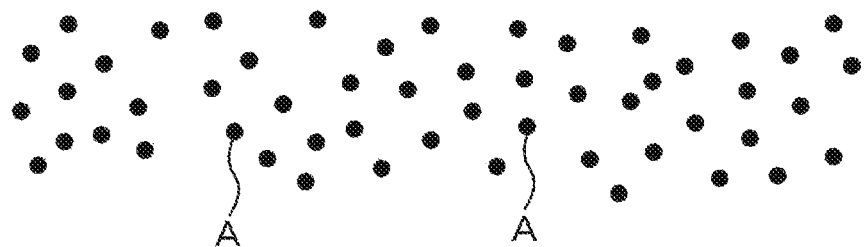
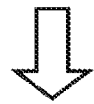
FIG.14C
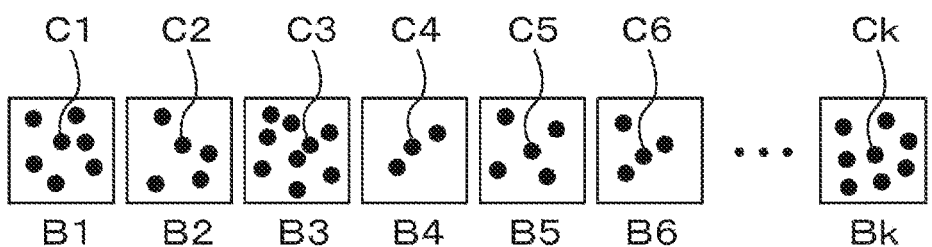
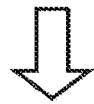
FIG.14D
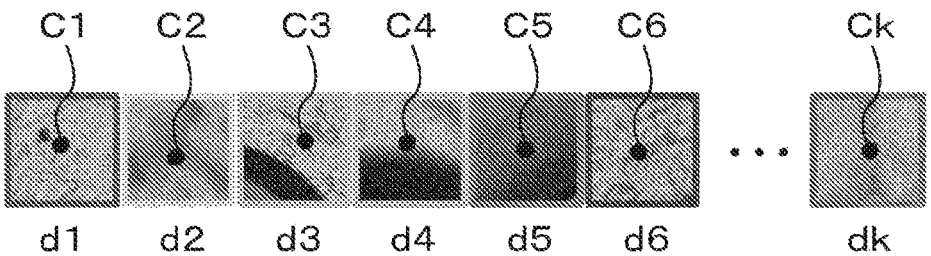

FIG.17

| No. | PARAMETER | SETTING RANGE | PARAMETER SET ||||| | |
|---|---|---|---|---|---|---|---|---|---|
| | | | CONDITION 1 | CONDITION 2 | CONDITION 3 | CONDITION 4 | CONDITION 5 | · · · | CONDITION 5400 |
| 1 | parameter_A | 1, 2, 3 | 1 | 1 | 1 | 2 | 2 | · · · | 3 |
| 2 | parameter_B | 1, 2, 3, | 1 | 2 | 3 | 1 | 2 | · · · | 3 |
| 3 | parameter_C | 1, 10, 100 | 1 | 1 | 1 | 1 | 1 | · · · | 100 |
| 4 | parameter_D | 1000 | 1000 | 1000 | 1000 | 1000 | 1000 | · · · | 1000 |
| 5 | parameter_E | 0.5, 1.0, 1.5, 2.0, 2.5 | 0.5 | 0.5 | 0.5 | 0.5 | 0.5 | · · · | 2.5 |
| 6 | parameter_F | 0.5, 1.0, 1.5, 2.0, 2.5 | 0.5 | 0.5 | 0.5 | 0.5 | 0.5 | · · · | 2.5 |
| 7 | parameter_G | 3000 | 3000 | 3000 | 3000 | 3000 | 3000 | · · · | 3000 |
| 8 | parameter_H | 3000 | 3000 | 3000 | 3000 | 3000 | 3000 | · · · | 3000 |
| 9 | parameter_I | 0, 1 | 0 | 0 | 0 | 0 | 0 | · · · | 1 |
| 10 | parameter_J | 0, 5 | 0 | 0 | 0 | 0 | 0 | · · · | 5 |
| 11 | parameter_K | 0.6, 0.8 | 0.6 | 0.6 | 0.6 | 0.6 | 0.6 | · · · | 0.8 |
| 12 | parameter_L | 0.01 | 0.01 | 0.01 | 0.01 | 0.01 | 0.01 | · · · | 0.01 |
| 13 | parameter_M | 100 | 100 | 100 | 100 | 100 | 100 | · · · | 100 |
| 14 | parameter_N | 1 | 1 | 1 | 1 | 1 | 1 | · · · | 1 |

FIG.19

| | REGISTERED IMAGE | IDENTIFICATION IMAGE | GRAPH No. |
|---|---|---|---|
| ILLUMINATION DISTANCE 1 | LIGHT INTENSITY SET VALUE 1<br>LIGHT INTENSITY SET VALUE 2<br>LIGHT INTENSITY SET VALUE 3<br>⋮ | LIGHT INTENSITY SET VALUE 1 | A1 |
| | LIGHT INTENSITY SET VALUE 1<br>LIGHT INTENSITY SET VALUE 2<br>LIGHT INTENSITY SET VALUE 3<br>⋮ | LIGHT INTENSITY SET VALUE 2 | A2 |
| | LIGHT INTENSITY SET VALUE 1<br>LIGHT INTENSITY SET VALUE 2<br>LIGHT INTENSITY SET VALUE 3<br>⋮ | LIGHT INTENSITY SET VALUE 3 | A3 |
| ILLUMINATION DISTANCE 2 | LIGHT INTENSITY SET VALUE 1<br>LIGHT INTENSITY SET VALUE 2<br>LIGHT INTENSITY SET VALUE 3<br>⋮ | LIGHT INTENSITY SET VALUE 1 | B1 |
| | LIGHT INTENSITY SET VALUE 1<br>LIGHT INTENSITY SET VALUE 2<br>LIGHT INTENSITY SET VALUE 3<br>⋮ | LIGHT INTENSITY SET VALUE 2 | B2 |
| | LIGHT INTENSITY SET VALUE 1<br>LIGHT INTENSITY SET VALUE 2<br>LIGHT INTENSITY SET VALUE 3<br>⋮ | LIGHT INTENSITY SET VALUE 3 | B3 |
| ⋮ | ⋮ | ⋮ | ⋮ |

INDIVIDUAL OBJECT IDENTIFICATION SYSTEM, INDIVIDUAL OBJECT IDENTIFICATION PROGRAM, AND RECORDING MEDIUM

CROSS-REFERENCE TO RELATED APPLICATION

This application is the U.S. bypass application of International Application No. PCT/JP2021/015596 filed on Apr. 15, 2021 which designated the U.S. and claims priority to Japanese Patent Application No. 2020-080319, filed on Apr. 30, 2020, the contents of both of which are incorporated herein by reference.

TECHNICAL FIELD

The present disclosure relates to an individual object identification system, an individual object identification program, and a recording medium that enable identification of an individual based on an individually unique pattern seen on an individual surface, or so-called individual fingerprint.

BACKGROUND

A high traceability of industrial products and the like has recently been required for, for example, not only a process of distribution after production but also even a process of production. For example, even the same type of components produced through the same process and in the same lot would have a slight difference in performance that is too small to become a problem for normal use. Accordingly, if products can be manufactured in an optimal combination with such a slight difference in characteristics among individual components taken into consideration, the performance of the products can be improved (refer to JP 2012-103758 A, JP 2012-181566 A, for example).

In addition, in a conventional process of production, conditions for machining components or the like and an inspection result are not associated with each other, so that it is difficult to reflect the inspection result in the conditions for machining or the like. Accordingly, if components can be traced on a one-by-one basis during a process of production, an inspection result can be suitably reflected in conditions for machining or the like, thus enabling a reduction of defects and a further improvement in quality and performance.

SUMMARY

According to an aspect of the present disclosure, an individual object identification system includes: an image acquisition processor configured to perform an image acquisition process to acquire an image of a subject acquired using imaging equipment; a feature point extraction processor configured to perform a feature point extraction process to extract a feature point from the image acquired through the image acquisition process; a local feature amount calculation processor configured to perform a local feature amount calculation process to calculate a local feature amount of the feature point extracted through the feature point extraction process; a local feature amount group classification processor configured to perform a local feature amount group classification process to classify a plurality of the local feature amounts obtained through the local feature amount calculation process into a predetermined number of local feature amount groups in accordance with values of the local feature amounts; a global feature amount calculation processor configured to perform a global feature amount calculation process to calculate a global feature amount based on each of the local feature amount groups; a searching target image registration processor configured to perform a searching target image registration process to register, as a registered image, each of a plurality of images that are searching targets in a searching target image registered in advance; a global feature amount registration processor configured to perform a global feature amount registration process to register the global feature amount related to the registered image in a global feature amount registration unit; a narrowing processor configured to perform a narrowing process to narrow down a plurality of the registered images to a predetermined number of the registered images each having the global feature amount highly correlated with the global feature amount of the identification image as candidates; and a determination processor configured to perform a determination process to compare the local feature amounts of the registered images as the candidates extracted through the narrowing process with the local feature amount of the identification image and determine the registered image with the local feature amount having a largest number of corresponding points.

BRIEF DESCRIPTION OF THE DRAWINGS

The above features of the present disclosure will be made clearer by the following detailed description, given referring to the appended drawings. In the accompanying drawings:

FIGS. 13A-13C are diagrams schematically illustrating an example of a technique of calculating a global feature amount from a local feature amount in the individual object identification system according to the embodiment;

FIGS. 14A-14D are diagrams schematically illustrating an example of a method of generating a global feature amount dictionary in the individual object identification system according to the embodiment;

FIG. 17 is a table illustrating an example of a parameter set in the individual object identification system according to the embodiment;

FIG. 19 is a table illustrating an example of a combination of conditions generated by a brute-force condition generation process in the individual object identification system according to the embodiment;

DETAILED DESCRIPTION OF THE PREFERRED EMBODIMENTS

Figure 1:
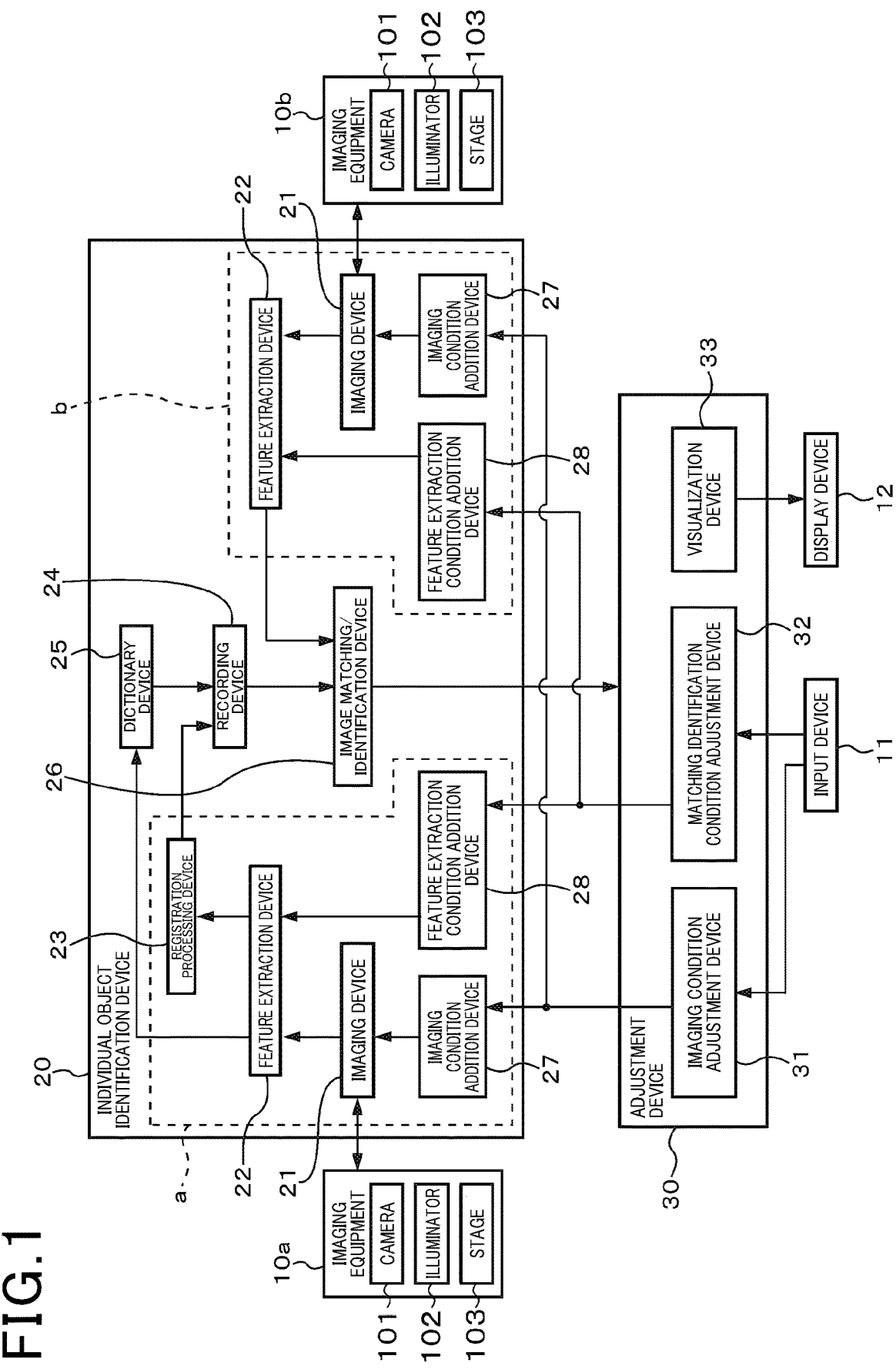
FIG. 1 is a block diagram illustrating an example of a schematic configuration of an individual object identification system according to an embodiment.

Conventional techniques of tracing management of products or the like include, for example, a technique using a two-dimensional code or an RFID tag. However, a two-dimensional code or an RFID tag is costly to print or stick. Therefore, it is actually difficult to provide two-dimensional codes or RFID tags to a lot of components constituting a product one by one even from an economic point of view.

Accordingly, a technology for identifying individual objects using respective unique surface textures of the individual objects has attracted attention. Such a surface texture or a pattern of an object, which eliminates the necessity of providing a two-dimensional code, an RFID tag, or the like, enables individual tracing management of components at low cost.

However, components manufactured by the same process have a significantly small difference in features among individual objects as compared with biometric identification using a face, fingerprint, or the like of a person. Thus, identification of an individual object using a surface texture or pattern of an object requires matching of a large number of features visible on surfaces of the individual objects. As a result, the identification requires time due to an increase in the amount of calculation and, further, the amount of calculation inevitably greatly increases with an increase in the number of parameters of targets to be identified.

The present disclosure is made in view of the above-described problem and an object thereof is to provide an individual object identification system, an individual object identification program, and a storage medium that enable high-speed and accurate identification with the amount of calculation reduced even though the number of parameters of targets to be identified increases.

According to an aspect of the present disclosure, an individual object identification system includes: an image acquisition processor configured to perform an image acquisition process to acquire an image of a subject acquired using imaging equipment; a feature point extraction processor configured to perform a feature point extraction process to extract a feature point from the image acquired through the image acquisition process; a local feature amount calculation processor configured to perform a local feature amount calculation process to calculate a local feature amount of the feature point extracted through the feature point extraction process; a local feature amount group classification processor configured to perform a local feature amount group classification process to classify a plurality of the local feature amounts obtained through the local feature amount calculation process into a predetermined number of local feature amount groups in accordance with values of the local feature amounts; a global feature amount calculation processor configured to perform a global feature amount calculation process to calculate a global feature amount based on each of the local feature amount groups; a searching target image registration processor configured to perform a searching target image registration process to register, as a registered image, each of a plurality of images that are searching targets in a searching target image registered in advance; a global feature amount registration processor configured to perform a global feature amount registration process to register the global feature amount related to the registered image in a global feature amount registration unit; a narrowing processor configured to perform a narrowing process to narrow down a plurality of the registered images to a predetermined number of the registered images each having the global feature amount highly correlated with the global feature amount of the identification image as candidates; and a determination processor configured to perform a determination process to compare the local feature amounts of the registered images as the candidates extracted through the narrowing process with the local feature amount of the identification image and determine the registered image with the local feature amount having a largest number of corresponding points.

In this configuration, the narrowing processor performs the narrowing process, comparing the global feature amounts of the registered image and the identification image to roughly narrow down the registered images as candidates. The narrowing process can be done at a much higher speed by virtue of a smaller amount of calculation than the determination process including comparing all the respective local feature amounts of the images but is unlikely to be accurate. Accordingly, the determination processor subsequently performs the determination process, comparing the local feature amounts of the registered images narrowed down as candidates and the identification image to determine a target. The determination process is excellent in accuracy, although taking a longer time due to a larger amount of calculation than the narrowing process including comparing the global feature amounts. Therefore, by virtue of performing a two-stage process including the narrowing process to perform narrowing in accordance with the global feature amounts and the determination process to perform determination in accordance with the local feature amounts, the individual object identification system enables a high-speed search with a high accuracy. This is effective especially in a case where the parameters of the registered images are increased.

Moreover, in the aspect of the present disclosure, the individual object identification system includes at least one of an imaging equipment condition adjustment processor configured to perform an imaging equipment condition adjustment process to adjust a condition regarding the imaging equipment, or imaging equipment condition, based on a user operation, an imaging target condition adjustment processor configured to perform an imaging target condition adjustment process to adjust imaging target condition which is a condition regarding an imaging target, based on a user operation, and a feature extraction condition adjustment processor configured to perform a feature extraction condition adjustment process to adjust a condition regarding the feature point extraction process, or feature extraction condition, based on a user operation.

This enables a user to set a variety of conditions and parameters, i.e., perform tuning, by operating at least one of the imaging equipment condition adjustment processor, the imaging target condition adjustment processor, and the feature extraction condition adjustment processor. As a result, even in a case where, for example, machining that causes a change in the surface pattern during a manufacturing process is applied, i.e., a surface pattern is changed between when an image is registered and when the image is identified, a flexible adaptation to the change is able to perform identification at a high speed with a high accuracy.

Description will be made below on an embodiment with reference to drawings. It should be noted that arrows in the block diagrams indicate a flow of data. Processors, or functional blocks, described in the present embodiment can be in the form of pieces of hardware different from each other or a plurality of devices or processors may share a single piece of hardware. In addition, the pieces of hardware constituting the devices and processors, details of which are not illustrated, may each mainly include, for example, a microcomputer including a CPU and storage regions such as a ROM, a RAM, and a writable flash memory. The storage region stores an individual object identification program for implementing the devices and the processors. The CPU then executes the individual object identification program, thereby enabling processes of the devices and the processors to be implemented.

That is to say, the processors described in the present embodiment are implemented by the CPU executing a computer program stored in a non-transitory tangible storage medium such as the above-described storage region to execute a process corresponding to the computer program, or implemented by software. It should be noted that at least a part of the processes may be implemented by hardware in some configurations.

An individual object identification system 1 of the present embodiment is a system capable of comparing a plurality of registered images registered in advance with an identification image acquired using imaging equipment and identifying, among the plurality of registered images, a registered image showing a subject of the identification image. The individual object identification system 1 is usable for tracing a component in, for example, a factory or the like without limitation.

The individual object identification system 1 includes imaging equipment 10, an input device 11, a display device 12, an individual object identification device 20, and an adjustment device 30 as illustrated in FIG. 1. In the case of the present embodiment, the individual object identification system 1 includes registration-side imaging equipment 10 and identification-side imaging equipment 10. In the description below, to distinguish them from each other, the registration-side imaging equipment 10 is referred to as registration-side imaging equipment 10a and the identification-side imaging equipment 10 is referred to as identification-side imaging equipment 10b in some cases. In the present embodiment, the registration-side imaging equipment 10a acquires an image to be registered in the individual object identification device 20. In contrast, the identification-side imaging equipment 10b is intended to acquire a subject to be identified. Moreover, in the present embodiment, the registered image refers to an image acquired mainly using the registration-side imaging equipment 10a and to be registered or registered in the individual object identification device 20. In contrast, the identification image refers to an image acquired mainly using the identification-side imaging equipment 10b.

The imaging equipment 10 includes a camera 101, an illuminator 102, and a stage 103. The camera 101 has a function to acquire a subject that is an imaging target, such as a workpiece. The camera 101 is configured such that shutter speed, sensitivity of an image sensor, resolution, imaging region, focal point, and the like thereof are changeable in accordance with external instructions. The illuminator 102, which is intended to illuminate a subject, is configured such that brightness, luminosity, color, and the like are changeable in accordance with external instructions. The stage 103, which supports the camera 101 and the illuminator 102 and on which a subject is to be placed, is configured such that a distance and an angle, i.e., attitude, between the camera 101 and the illuminator 102 and the subject are changeable.

The input device 11, which is an interface that receives a user operation, includes, for example, a keyboard, a mouse, or the like. A user can provide a variety of settings and the like with respect to the adjustment device 30 and the individual object identification device 20 by operating the input device 11. The display device 12, which includes a display capable of displaying a character, an image, and the like, can display information received from the individual object identification device 20 and the adjustment device 30. The user can check results of processes performed by the individual object identification device 20 and the adjustment device 30, setting content, and the like by looking at information displayed on the display device 12

The individual object identification device 20 includes an imaging device 21, a feature extraction device 22, a registration processing device 23, a recording device 24, a dictionary device 25, an image matching/identification device 26, an imaging condition addition device 27, and a feature extraction condition addition device 28. In the case of the present embodiment, the imaging device 21, the feature extraction device 22, the registration processing device 23, the recording device 24, the imaging condition addition device 27, and the feature extraction condition addition device 28 are provided for each of registration side and identification side. In this case, devices surrounded by a broken line a are registration-side devices and devices surrounded by a broken line b are identification-side devices. It should be noted that the registration-side devices a and the identification-side devices b may be in the form of different pieces of hardware or may be in the form of the same hardware. In addition, the individual object identification device 20 and the adjustment device 30 may be installed on a cloud server connected to a telecommunication line such as the Internet.

Figure 2:
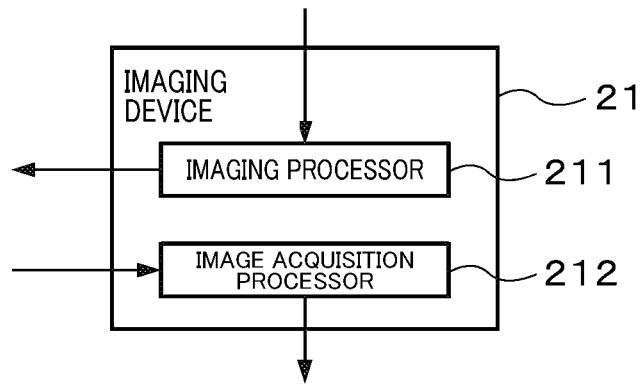
FIG. 2 is a block diagram illustrating an example of a schematic configuration of an imaging device of the individual object identification system according to the embodiment.

The imaging device 21 has a function to control driving of the imaging equipment 10 to acquire an image of a subject. The imaging device 21 includes an imaging processor 211 and an image acquisition processor 212 as illustrated in FIG. 2. The imaging processor 211 acquires a subject by driving the imaging equipment 10 under a predetermined condition. In this case, the predetermined conditions for causing the imaging equipment 10 to perform imaging is referred to as an imaging condition. The imaging conditions include, for example, conditions regarding the imaging equipment 10, or imaging equipment conditions, and conditions regarding a subject that is an imaging target, or imaging target conditions.

The imaging equipment conditions, which are conditions mainly regarding optical equipment, includes, for example, the shutter speed, sensitivity of the image sensor, resolution, imaging region, focal point, magnification, and aperture of the camera 101 of the imaging equipment 10 and the type, brightness, luminosity, and color of the illuminator 102. The imaging target conditions, which are conditions regarding an imaging target, or subject, include, for example, an attitude of the subject, i.e., angles of the subject relative to the camera 101 and the illuminator 102, and distances between the camera 101 and the illuminator 102 and the subject.

The imaging processor 211 enables the imaging equipment 10 to be driven with the imaging equipment condition and the imaging target condition changed based on contents of instructions received from the imaging condition addition device 27 to acquire a subject.

The image acquisition processor 212 is configured to perform an image acquisition process. The image acquisition process includes a process to acquire and pass the image of the subject acquired using the imaging equipment 10 to the feature extraction device 22. In the case of the present embodiment, the image acquisition processor 212 on the registration side a passes, as a registered image, the image acquired using the imaging equipment 10*a* to the feature extraction device 22 on the registration side a. In contrast, the image acquisition processor 212 on the identification-side b passes, as an identification image, the image acquired using the imaging equipment 10*b* to the feature extraction device 22 on the identification side b. In the present embodiment, among the image acquisition process, a process to acquire a registered image to be performed on the registration side a is referred to as a registered image acquisition process and a process to acquire an identification image to be performed on the identification side b is referred to as an identification image acquisition process in some cases. It should be noted that the image acquisition process may include, for example, a process to acquire an image from means other than the imaging equipment 10, such as acquisition of an image through the Internet or via a storage medium.

Figure 3:
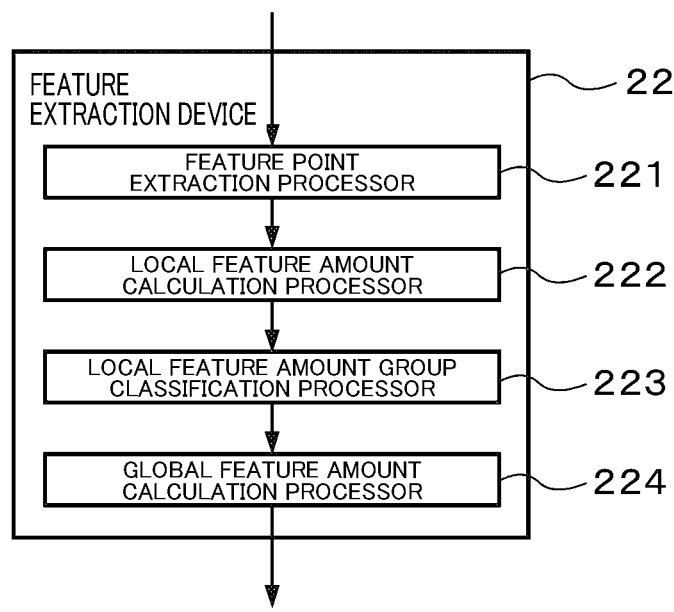
FIG. 3 is a block diagram illustrating an example of a schematic configuration of a feature extraction device of the individual object identification system according to the embodiment.

The feature extraction device 22 has a function to extract a feature contained in the image acquired from the imaging device 21. The feature extraction device 22 has a function to calculate, as the feature of the image, a feature point, a local feature amount, and a global feature amount. The feature extraction device 22 includes a feature point extraction processor 221, a local feature amount calculation processor 222, a local feature amount group classification processor 223, and a global feature amount calculation processor 224 as illustrated in FIG. 3. The feature extraction device 22 performs processes of the processors 221 to 224 in response to feature extraction conditions from the feature extraction condition addition device 28. The feature extraction conditions include, for example, the number of steps of a pyramided image for extracting a feature point and calculating a local feature amount and a threshold for determining similarity to a corner or a curve.

Figure 11:
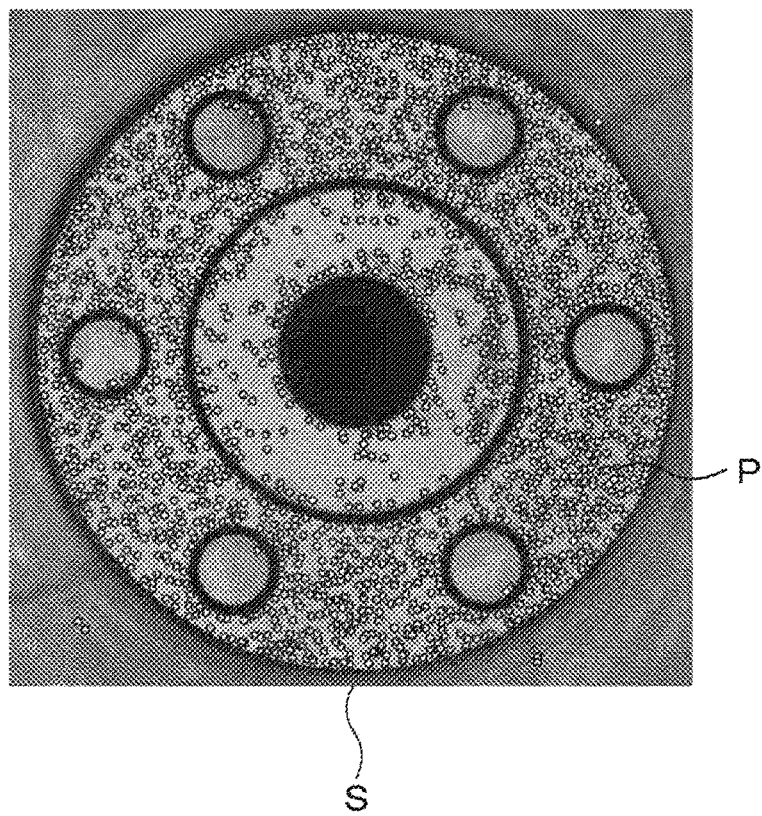
FIG. 11 is a first diagram illustrating an example of an execution result of a feature point extraction process in the individual object identification system according to the embodiment.

The feature point extraction processor 221 is configured to perform a feature point extraction process. The feature point extraction process includes a process to extract one or more feature points P seen on a surface of a subject S from the image acquired by the image acquisition processor 212 as illustrated in FIG. 11. In the case of the present embodiment, the feature point extraction process extracts, for example, several thousands of feature points from a single image. In this case, the feature point extraction processor 221 on the registration-side a can extract feature points of the registered image acquired using the registration-side imaging equipment 10*a*. In contrast, the feature point extraction processor 221 on the identification-side b can extract feature points of the identification image acquired using the identification-side imaging equipment 10*b*.

Figure 12:
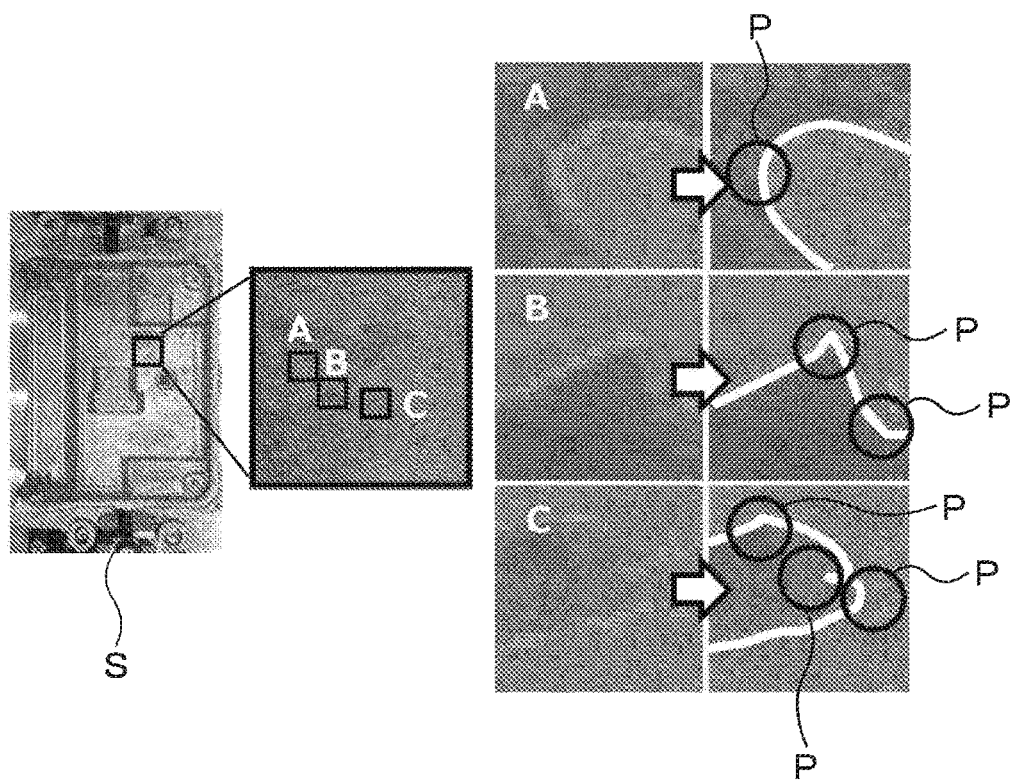
FIG. 12 is a second diagram illustrating an example of the execution result of the feature point extraction process in the individual object identification system according to the embodiment.

Here, it is considered that, for example, as illustrated in FIG. 12, a non-geometric pattern such as a corner or a curve among patterns seen on the surface of the workpiece S is extracted as the feature point P, which enables individual object identification even between the same type of components manufactured through the same manufacturing process. This is believed to be because, for example, a geometric pattern such as a straight line or a right angle seen on a surface of a component or the like is often a pattern commonly seen among all of that type of components and thus unlikely to become a feature useful for individual object identification between the components, whereas a non-geometric pattern such as a corner or a curve is often a pattern resulting from a significant but slight difference in condition caused during a manufacturing process and thus often unique to that individual object. Accordingly, the feature point extraction processor 221 of the present embodiment extracts, as the feature point P, a pattern including a corner or a curve locally seen on a surface of a subject.

The feature point extraction processor 221 of the present embodiment extracts, as a feature point, a corner or a curve locally seen on a surface of a subject using brightness gradient intensity distribution obtained from an image of the subject. The image has a gradient of brightness and an intensity thereof between pixels. A uniform pattern has a less spread brightness gradient intensity and a linear pattern has a brightness gradient intensity spread in a specific direction. In contrast, a pattern including a corner or a curve has a brightness gradient intensity spread in a plurality of directions. This enables the feature point extraction processor 221 to extract the corner or the curve, which becomes a feature point, by searching for a pattern having a brightness gradient intensity widened in a plurality of directions.

The local feature amount calculation processor 222 is configured to perform a local feature amount calculation process. The local feature amount calculation process includes a process to calculate, based on a brightness gradient of a region in the vicinity of a feature point, including the feature point, extracted by the feature point extraction process, the feature amount of the feature point as a local feature amount. The local feature amount includes coordinates of the feature point and a 256-bit binary feature amount. An existing technology SIFT is usable to calculate the feature amount. In addition, another image feature amount calculation algorithm such as SURF may be used, if possible. The feature point extraction process may include obtaining pyramided images reduced in size stepwise and independently performing extraction of a feature point for each of the images with reduced scales under the same condition. Then, the local feature amount calculation processor may calculate the local feature amount of the feature point obtained in each of the pyramided images. This makes it possible to obtain a local feature amount having a scale invariance and unlikely to be affected by a difference in scale.

The local feature amount group classification processor 223 is configured to perform a local feature amount group classification process. The local feature amount group classification process is a process that is advance preparation for calculation of the global feature amounts of the registered image and the identification image. For example, as illustrated in FIGS. 13(A) and (B), the local feature amount group classification process includes a process to classify a plurality of local feature amounts A obtained by performing the local feature amount calculation process for the images to produce a predetermined number of local feature amount groups B, for example, 64 to 4096 of them, in accordance with values of the local feature amounts A. In other words, the local feature amount group classification process includes a process to collect and cluster, among a large number of local feature amounts A obtained from the images, ones similar in value. Elements Bn constituting the local feature amount groups B each include at least one or more pairs of feature points obtained from the images and the local feature amounts thereof. It should be noted that n in Bn denotes an integer indicating the number of elements.

The local feature amount group classification process includes a process to classify the local feature amounts A obtained from the images based on dictionary information d. The dictionary information d is a representative feature amount among the feature amounts of the feature points obtained from an image for learning acquired in advance and is prepared before the local feature amount classification process is performed. The local feature amount group classification processor 223 classifies the local feature amount A to be classified by applying it to the dictionary information d that has feature amount close to the local feature amount A.

The global feature amount calculation processor 224 is configured to perform a global feature amount calculation process. The global feature amount calculation process includes a process to calculate the global feature amount based on each of the local feature amount groups B obtained through a local feature amount separation process. The global feature amount calculation process includes a process to calculate, as the global feature amount, a frequency distribution, or histogram, obtained by voting for the dictionary information d highly correlated with each of the local feature amounts A obtained from the image as illustrated in FIG. 13C. That is to say, the global feature amount is represented by plotting the local feature amount groups B on an abscissa axis and the counts of votes for each of the local feature amount groups B on the ordinate axis. By virtue of the use of the thus-calculated global feature amount, a single image can be expressed by a single feature amount. For the global feature amount calculation process, for example, VLAD or BAG-OF-WORDS is usable as a calculation method.

In a case where VLAD is employed as a method of calculating the global feature amount, the global feature amount calculation process, for example, calculates a vector V, which is the sum of the difference vectors between the local feature values and the representative values, which are dictionary information with high correlation, for the number of representative values, and calculates the vector V of the global feature values as the vector V of the global feature values by connecting these vectors. Specifically, the global feature amount calculation processor 224 calculates the vector V of the global feature amount by applying the local feature amount obtained from an image to a calculation of Expression (1) below. In this case, the vector V of the global feature amount includes 64 128-dimensional vectors. In this case, v denotes the local feature amounts contained in each of the local feature amount groups B and d denotes the dictionary information. In addition, assuming that N denotes the number of feature amounts contained in each of the local feature amount groups B, $1 \leq i \leq N$.

$$Vk = \sum_{v \text{ such that } NN(v)=d} vi - dk \quad (1)$$

It should be noted that NN(v)=dk in Expression (1) represents, among the feature amounts contained in an image, a local feature amount v most highly correlated with each of 64 pieces of dictionary information d in this case.

In addition, in a case where BAG-OF-WORDS is employed as a global feature amount, a global feature amount dictionary generation process includes calculating the global feature amount as follows. In this case, the global feature amount is a vector with as many dimensions as the number of pieces of dictionary information, for example, a 64-dimensional vector V. With use of the 64 representative values, or pieces of dictionary information, a global feature amount dictionary generation processor 251 searches for the dictionary information d closest to each of the feature amounts and adds 1 to the elements of the closest vector V. This causes the vector V to turn into a histogram of the feature amounts and the sum of the elements of the vector V becomes equal to the number of the feature amounts. The vector V is divided as a whole by the sum to be used in normalized form.

Figure 4:
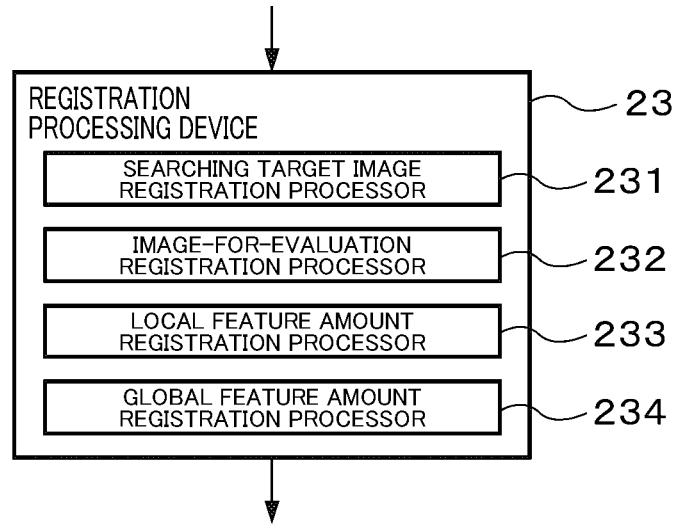
FIG. 4 is a block diagram illustrating an example of a schematic configuration of a registration processing device of the individual object identification system according to the embodiment.

The registration processing device 23 has a function to record data obtained by each of the processes in the recording device 24. The registration processing device 23 includes a searching target image registration processor 231, an image-for-evaluation registration processor 232, a local feature amount registration processor 233, and a global feature amount registration processor 234 as illustrated in FIG. 4. The searching target image registration processor 231 is configured to perform a searching target image registration process. The searching target image registration process includes a process to register a plurality of images that are searching targets in advance as registered images in a searching target image register 241 of the recording device 24.

The image-for-evaluation registration processor 232 is configured to perform an image-for-evaluation registration process. The image-for-evaluation registration process includes a process to register an image to be used for evaluation in a matching process, which is to be performed by the image matching/identification device 26, as an image for evaluation in an evaluation image register 242 of the recording device 24. The image for evaluation includes a registered image group including a plurality of registered images obtained by imaging subjects different from each other and an identification image obtained by imaging the same subject as that of one among the registered image group under a different condition. In this case, a plurality of identification images may be included in accordance with the number of subjects or conditions. In addition, the registered image and identification image obtained by imaging the same subject are, for example, designated with identification numbers or the like that are the same or have a common part to be associated with each other and then registered in the evaluation image register 242 of the recording device 24.

The local feature amount registration processor 233 is configured to perform a local feature amount registration process. The local feature amount registration process includes a process to register the local feature amount of a feature point extracted from the registered image through the process of the feature extraction device 22 in a local feature amount register 243 of the recording device 24. The local feature amount registration process also includes a process to register the local feature amount of a feature point extracted from the image for evaluation through the process of the feature extraction device 22 in the local feature amount register 243 of the recording device 24. The local feature amount registration processor 233 registers the local feature amount obtained from each of the images in association with the image that is an extraction source.

The global feature amount registration processor 234 is configured to perform a global feature amount registration process. The global feature amount registration process includes a process to register a global feature amount related to the registered image in a global feature amount registration unit 244 of the recording device 24. The global feature amount registration process also includes a process to register a global feature amount related to the image for evaluation in the global feature amount registration unit 244 of the recording device 24. The local feature amount registration processor 233 registers the global feature amount obtained from each of the images in association with the image that is the extraction source.

Figure 5:
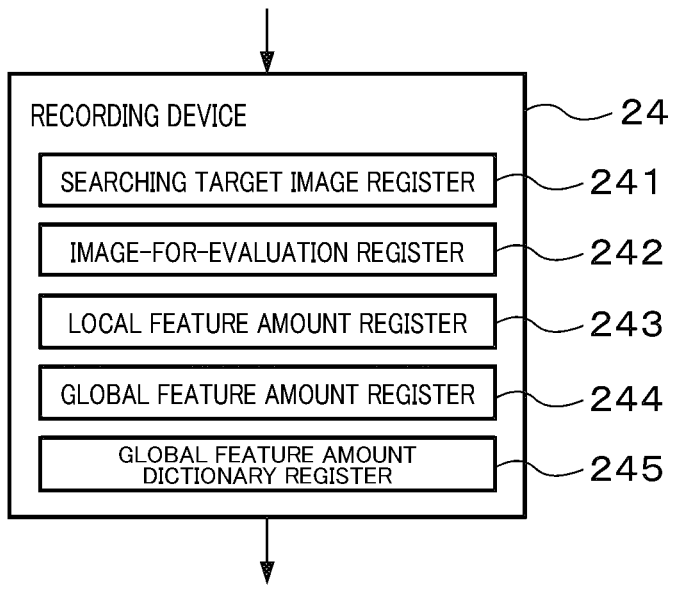
FIG. 5 is a block diagram illustrating an example of a schematic configuration of a recording device of the individual object identification system according to the embodiment.

The recording device 24 has a function to record a variety of data sent by the registration processes of the registration processing device 23 and includes database. The recording device 24 can alternatively include, for example, a recording device of a computer constituting the individual object identification device 20 or an external server connected through a network line. The recording device 24 includes the searching target image register 241, the evaluation image register 242, the local feature amount register 243, the global feature amount registration unit 244, and a global feature amount dictionary register 245 as illustrated in FIG. 5.

The searching target image register 241 serves as a recording region where the searching target image sent from the searching target image registration processor 231 of the registration processing device 23 is to be recorded. The evaluation image register 242 serves as a recording region where the image for evaluation sent from the image-for-evaluation registration processor 232 of the registration processing device 23 is to be recorded. The local feature amount register 243 serves as a recording region where the local feature amount supplied from the local feature amount registration processor 233 of the registration processing device 23 is to be recorded. The global feature amount registration unit 244 serves as a recording region where the global feature amount sent from the global feature amount registration processor 234 of the registration processing device 23 is to be recorded.

In addition, the global feature amount dictionary register 245 serves as a recording region where a global feature amount dictionary sent from a global feature amount dictionary registration processor 252 of the dictionary device 25 is to be recorded. Before the image matching/identification device 26 performs a searching process, a plurality of global feature amount dictionaries are registered, the global feature amount dictionaries including as elements a plurality of pieces of dictionary information calculated based on the local feature amounts obtained from the image for learning acquired in advance.

Figure 6:
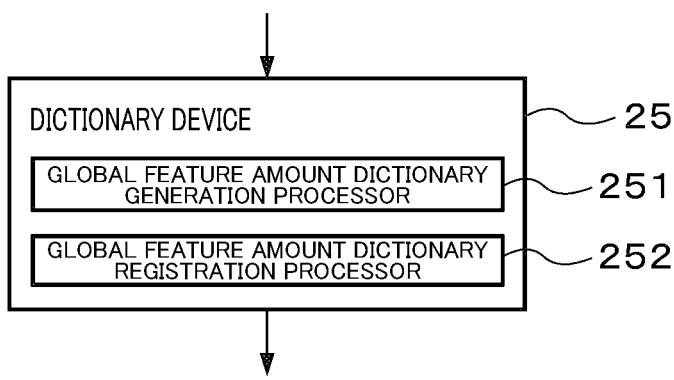
FIG. 6 is a block diagram illustrating an example of a schematic configuration of a dictionary device of the individual object identification system according to the embodiment.

The dictionary device 25 has a function to generate a plurality of pieces of dictionary information based on feature points extracted from a plurality of images and the local feature amounts thereof and generate, register, and set a global feature amount dictionary based on the dictionary information. The dictionary device 25 includes the global feature amount dictionary generation processor 251 and the global feature amount dictionary registration processor 252 as illustrated in FIG. 6.

The global feature amount dictionary generation processor 251 is configured to perform the global feature amount dictionary generation process. The global feature amount dictionary generation process includes, for example, a process to generate a global feature amount dictionary including, within dictionary information, the respective representative values of local feature amount groups obtained from a plurality of images for learning. In this case, the global feature amount dictionary generation process includes a process to set centroids of the local feature amount groups as the representative value in the dictionary information. The dictionary information is an element constituting the global feature amount dictionary and a plurality of pieces of dictionary information are put together to provide a single global feature amount dictionary.

In this case, for example, the global feature amount dictionary generation processor 251 can generate the global feature amount dictionary as follows during the global feature amount dictionary generation process. That is to say, during the global feature amount dictionary generation process, the global feature amount dictionary generation processor 251 first receives, for example, the local feature amounts A of m images for learning T1 to Tm calculated by the feature extraction device 22 as illustrated in FIGS. 14(A), (B). Next, as illustrated in FIG. 14C, the global feature amount dictionary generation processor 251, for example, classifies the received local feature amounts A into k clusters, which is 64 clusters in this case, or local feature amount groups B1 to Bk, by a k-means method and obtains respective centroids C1 to Ck of the local feature amount groups B1 to Bk. The global feature amount dictionary generation processor 251 then sets the thus-obtained centroids C1 to Ck of the local feature amount groups B1 to Bk as representative values of the respective local feature amount groups B1 to Bk in pieces of dictionary information d1 to dk and generates a global feature amount dictionary E where the pieces of dictionary information d1 to dk are put together. The global feature amount dictionary generation processor 251 then generates a plurality of global feature amount dictionaries E with use of other different images for learning T. It should be noted that the pieces of dictionary information d1 to dk are not limited to centroids as long as they indicate respective values representative of the local feature amount groups B1 to Bk.

The global feature amount dictionary registration processor 252 is configured to perform a global feature amount dictionary registration process. The global feature amount dictionary registration process includes a process to record a plurality of global feature amount dictionaries Eic, which are generated through the global feature amount dictionary generation process, in the global feature amount dictionary register 245 of the recording device 24. In this case, the global feature amount dictionary E includes the plurality of pieces of dictionary information d1 to dk constituting the global feature amount dictionary E.

Figure 7:
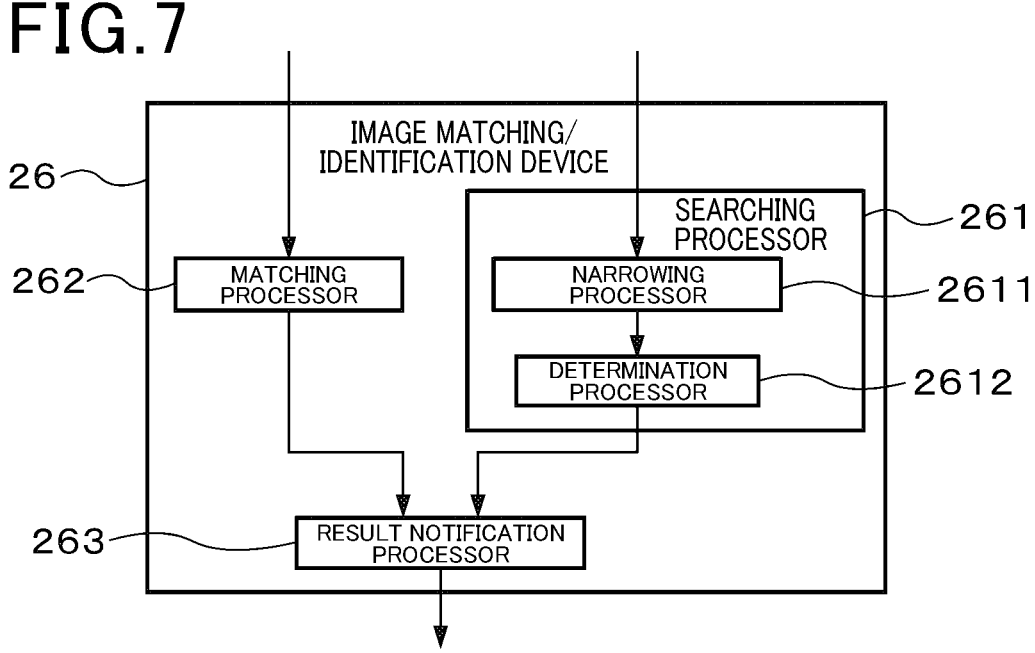
FIG. 7 is a block diagram illustrating an example of a schematic configuration of an image matching/identification device of the individual object identification system according to the embodiment.
Figure 8:
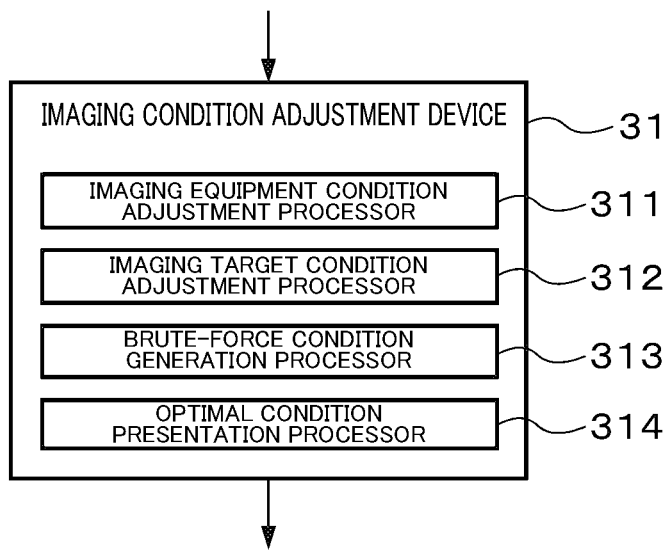
FIG. 8 is a block diagram illustrating an example of a schematic configuration of an imaging condition adjustment device of the individual object identification system according to the embodiment.

The image matching/identification device 26 has a function to perform matching of a registered image recorded in the recording device 24 with the identification image outputted from the identification-side feature extraction device 22 and identify whether the images are coincident with each other. The image matching/identification device 26 includes a searching processor 261, a matching processor 262, and a result notification processor 263 as illustrated in FIG. 7.

The searching processor 261 is configured to perform a searching process. The searching process includes a process to search for, among global feature amounts related to the plurality of registered images recorded in the searching target image register 241 of the recording device 24, the global feature amount highly correlated with the global feature amount related to the identification image sent from the identification-side feature extraction device 22. In the case of the present embodiment, the searching processor 261 includes a narrowing processor 2611 configured to perform a narrowing process and a determination processor 2612 configured to perform a determination process. That is to say, in the case of the present embodiment, the searching process includes the narrowing process and the determination process.

Figure 15:
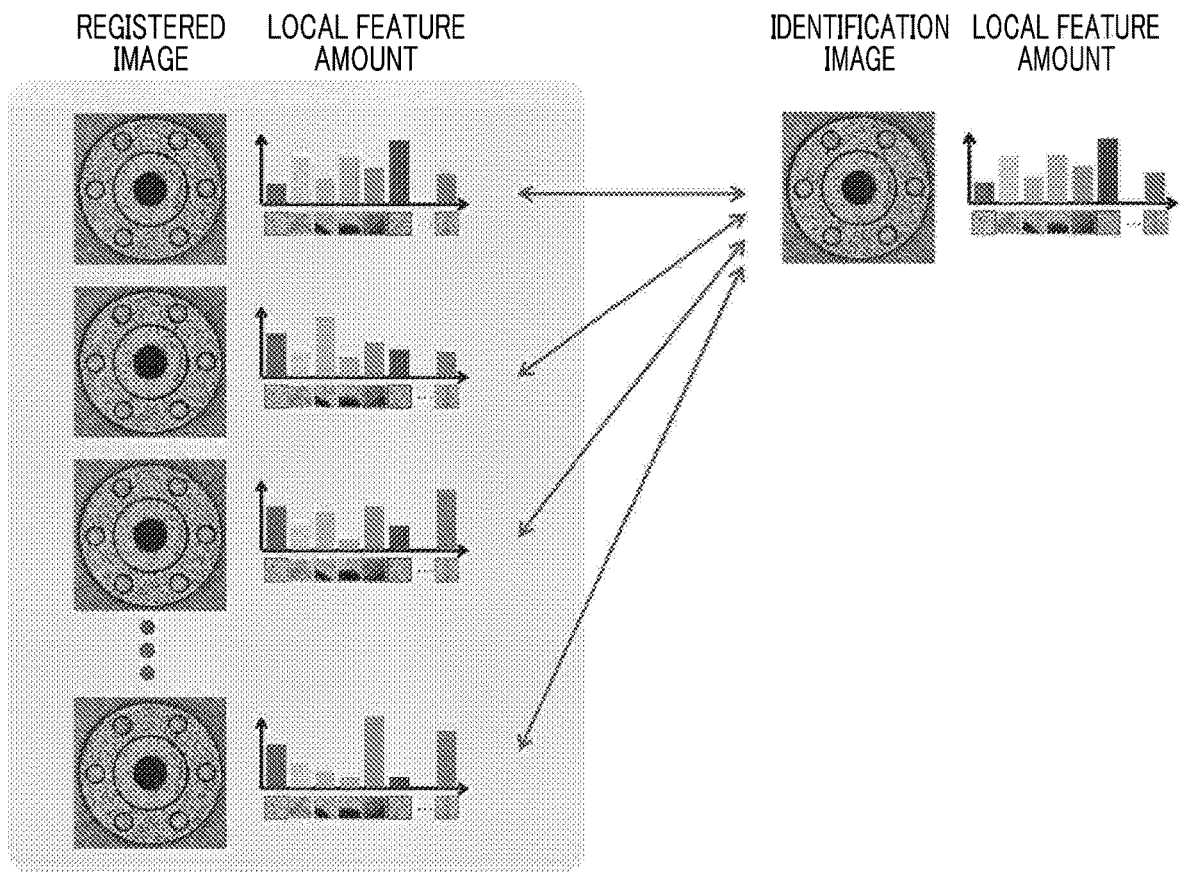
FIG. 15 is a diagram schematically illustrating an example of a narrowing process using the global feature amount in the individual object identification system according to the embodiment.

As illustrated in FIG. 15, the narrowing process to be performed by the narrowing processor 2611 includes a process to narrow down the plurality of registered images registered in the searching target image register 241 of the recording device 24 to a predetermined number of registered images with global feature amounts highly correlated with the global feature amount of the identification image as candidates. In a case where, for example, several thousands to several hundreds of thousands registered images are registered in the searching target image register 241, the registered images are narrowed down as candidates to, for example, several to several tens of them, approximately.

The determination process to be performed by the determination processor 2612 can be performed by an image matching technique using a local feature amount and an algorithm enabling verification of consistency in geometric arrangement of a feature point. The determination processor 2612 first compares the local feature amounts of the candidate registered images extracted through the narrowing process with the local feature amount of the identification image, thereby determining, from both the images, features points with the smallest difference in feature amount as a pair. The determination processor 2612 then extracts a feature point that is inconsistent in relative position relationship with other feature points as a corresponding point and determines the registered image having a largest number of such corresponding points.

Figure 16:
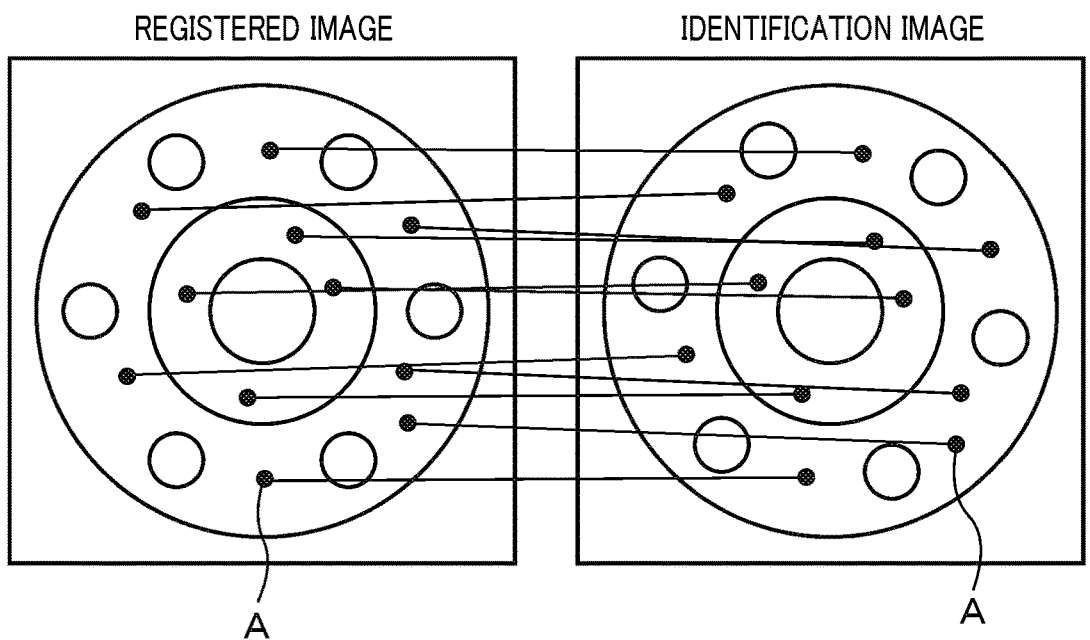
FIG. 16 is a diagram schematically illustrating an example of a determination process using the local feature amount in the individual object identification system according to the embodiment.

In this case, the narrowing process, which is a process including comparing the respective global feature amounts of the registered images and the identification image, is lower in accuracy but can be performed at a higher speed by virtue of being smaller in processing amount than the determination process including comparing all the local feature amounts contained in the images as illustrated in FIG. 15. In contrast, the determination process, which is a process including searching for corresponding points for all the respective local feature amounts A of the registered images and the identification image, takes a longer time due to a larger processing amount and but is higher in accuracy than the narrowing process including comparing the global feature amounts with each other as illustrated in FIG. 16. Thus, by virtue of performing a two-stage process, i.e., the narrowing process and the determination process, the searching process enables determining, among the plurality of registered images, the registered image identical to the identification image at a high speed with a high accuracy.

The matching processor 262 is configured to perform the matching process. The matching process, which is a process without searching for an image, is to be performed in matching specific images with each other so that a variety of conditions, algorithm, parameter, etc. are adjusted by the adjustment device 30. The matching process is performed using the same algorithm as the algorithm for matching images with each other during the searching process. Accordingly, the matching processor 262 can be considered as a part of the searching processor 261. The variety of conditions, algorithm, parameter, etc. adjusted by the adjustment device 30 are reflected in the searching process of the searching processor 261.

The matching process includes, for example, a process to compare the local feature amounts of a specific registered image, which is registered as the image for evaluation in the evaluation image register 242, and the identification image and acquire the number of corresponding points of the feature points to match the registered image and the identification image. In this case, the matching processor 262 is configured to perform matching between a registered image and an identification image obtained by imaging the same subject in accordance with instructions from the adjustment device 30. The matching processor 262 can also perform matching between a registered image and an identification image obtained by imaging different subjects in accordance with instructions from the adjustment device 30. The matching processor 262 outputs the number of corresponding points of the local feature amounts between the registered image and the identification image.

The matching processor 262 can also perform the matching process using a parameter set received from a matching identification condition adjustment device 32. The parameter set includes, for example, combinations of a plurality of parameters for setting conditions for the searching process and the matching process and respective settable values for the parameters as illustrated in FIG. 17. Condition 1, Condition 2, Condition 3 . . . in FIG. 17 each correspond to a single parameter set. In the case of an example in FIG. 17, the number of parameter sets is 5400 in total.

The result notification processor 263 is configured to perform a result notification process. The result notification process includes a process to output a result of the searching process and a result of the matching process to the adjustment device 30 and an external device. In this case, the result of the searching process includes information regarding the determined registered image. The result of the matching process also includes the number of corresponding points.

The imaging condition addition device 27 has a function to add the above-described imaging condition to the imaging device 21 in response to instructions from an imaging condition adjustment device 31 of the adjustment device 30. The feature extraction condition addition device 28 has a function to add feature extraction condition to the feature extraction device 22 in response to instructions from the matching identification condition adjustment device 32 of the adjustment device 30.

The adjustment device 30 has a function to visualize a result obtained from the image matching/identification device 26 and cause the display device 12 to display the result, a function to adjust, in response to a feedback from the image matching/identification device 26, a variety of conditions, algorithm, parameter, or the like to be used in the individual object identification device 20, such as the imaging condition for the imaging equipment 10 and condition and algorithm to be used in the feature extraction device 22, and the like. The adjustment device 30 includes the imaging condition adjustment device 31, the matching identification condition adjustment device 32, and a visualization device 33 as illustrated in FIG. 1.

The imaging condition adjustment device 31 has a function to adjust the variety of conditions for imaging an imaging target using the imaging equipment 10 automatically in response to the feedback from the image matching/identification device 26 or manually in response to an operation from a user and provide instructions regarding those conditions to the imaging condition addition device 27. A user can adjust the variety of conditions through the process of the imaging condition adjustment device 31 by for example, operating the input device 11. The imaging condition adjustment device 31 also has a function to automatically adjust the variety of conditions in accordance with the number of the feature points obtained through the process of the feature extraction device 22. The imaging condition adjustment device 31 includes an imaging equipment condition adjustment processor 311, an imaging target condition adjustment processor 312, a brute-force condition generation processor 313, and an optimal condition presentation processor 314 as illustrated in FIG. 7.

The imaging equipment condition adjustment processor 311 is configured to perform an imaging equipment condition adjustment process to adjust the imaging equipment condition. By virtue of performing the imaging equipment condition adjustment process, a condition mainly regarding optical equipment, such as the shutter speed of the camera 101 of the imaging equipment 10, the sensitivity of the image sensor, resolution, imaging region, focal point, and the brightness, luminosity, color of the illuminator 102, is adjusted. The imaging equipment condition adjustment processor 311 sends the adjusted imaging equipment condition to the imaging condition addition device 27. The imaging device 21 thus causes mainly the camera 101 and the illuminator 102 of the imaging equipment 10 to operate in accordance with the imaging equipment condition adjusted by the imaging equipment condition adjustment processor 311 to acquire the imaging target.

The imaging target condition adjustment processor 312 is configured to perform an imaging target condition adjustment process to adjust the condition regarding a subject that is the imaging target, or imaging target condition. By virtue of performing the imaging target condition adjustment process, for example, the attitude of the subject, i.e., the angles of the subject relative to the camera 101 and the illuminator 102, distances between the camera 101 and the illuminator 102 and the subject, and the like are adjusted. The imaging target condition adjustment processor 312 sends the adjusted imaging target condition to the imaging condition addition device 27. The imaging device 21 thus causes mainly the stage 103 of the imaging equipment 10 to operate in accordance with the imaging target condition adjusted by the imaging target condition adjustment processor 312 to acquire the imaging target.

The brute-force condition generation processor 313 performs a brute-force condition generation process. The brute-force condition generation process includes a process to generate combinations of imaging target conditions within a preset range and imaging equipment conditions within a preset range by brute force. In this case, the image acquisition process to be performed by the image acquisition processor 212 of the imaging device 21 includes a process to acquire images acquired under all the conditions generated through the brute-force condition generation process. This enables the image acquisition processor 212 to acquire a large number of images acquired under different conditions, i.e., a large number of images acquired with the imaging target condition and the imaging equipment condition individually changed.

For example, in an example in FIG. 19, the distance between a subject and the illuminator 102, or illumination distance, is set as the imaging target condition and a light intensity of the illuminator 102, or light intensity set value, is set as the imaging equipment condition. In this case, the brute-force condition generation processor 313 generates all the combinations of possible values of the illumination distance and the light intensity set value by brute force. The image acquisition processor 212 then automatically performs acquiring under such brute-force combinations of conditions to acquire registered images and identification images.

The optimal condition presentation processor 314 is configured to perform an optimal condition presentation process. The optimal condition presentation process includes a process to: cause the matching processor 262 to perform the matching process between, among the registered images and the identification image acquired under all the conditions generated through the brute-force condition generation process, the registered image and the identification image obtained by acquiring the same subject; and present to the user or automatically set a combination of the imaging target condition and the imaging equipment condition that provides a large number of corresponding points obtained through the matching process as optimal conditions. In this case, the optimal condition presentation processor 314 may cause the display device 12 to display the optimal conditions. This enables the user to easily find and set the optimal combination of the imaging equipment condition and the imaging target condition.

Figure 20A:
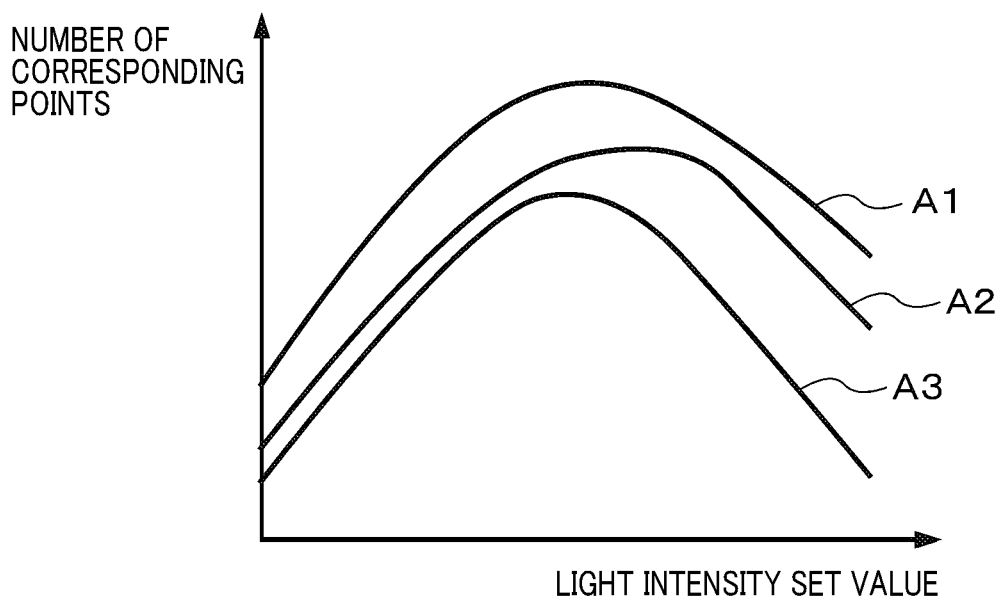
FIGS. 20A and 20B are graphs illustrating an example of a graph to be generated by an optimal condition presentation process in the individual object identification system according to the embodiment.
Figure 20B:
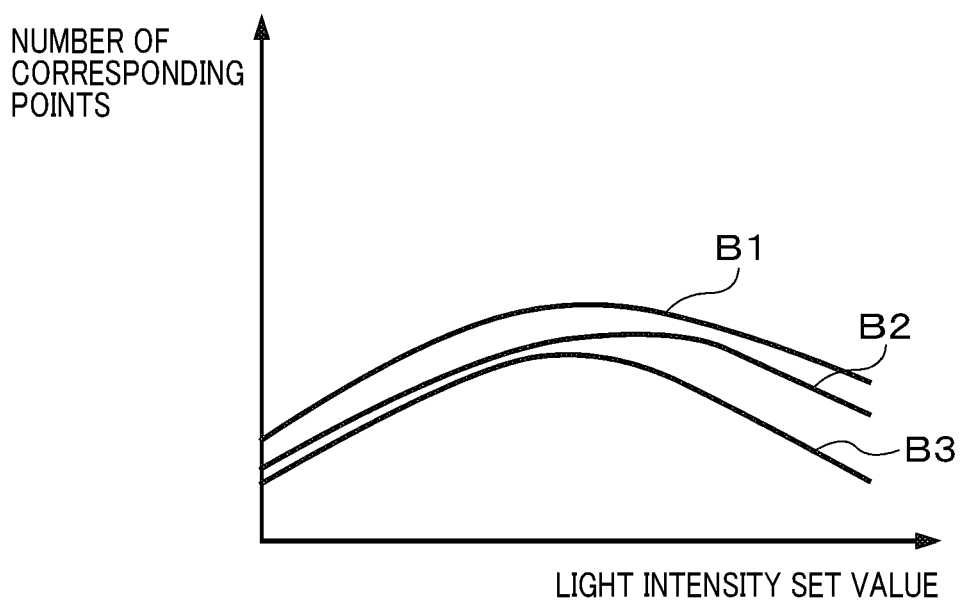

For example, in the case where the registered image and the identification image are obtained by acquiring the same subject under the conditions indicated in FIG. 19, the optimal condition presentation processor 314 generates, from the number of corresponding points of each image, for example, graphs illustrated in FIGS. 20A and 20B, or graph where the light intensity set value, i.e., Lux, is plotted on an abscissa axis and the number of corresponding points is plotted on an ordinate axis in this case. The optimal condition presentation processor 314 then finds, from this graph, a combination of conditions that provides a large number of corresponding points between the registered image and the identification image and has a high robustness. In this case, it is found that the number of corresponding points is the largest and the robustness is the highest at a light intensity set value at a vertex of a graph A1 of an illumination distance 1. Thus, in this case, the optimal condition presentation processor 314 presents the illumination distance 1 and the light intensity set value at the vertex of the graph A1 of the illumination distance 1 as the optimal conditions among the combinations of the imaging target condition and the imaging equipment condition. Thus, the optimal condition presentation processor 314 presents the optimal combination of the imaging target condition and the imaging equipment condition to the user. It should be noted that the optimal condition presentation processor 314 can also select some candidates for conditions providing a large number of corresponding points and having a high robustness and present these conditions as recommended conditions to the user. The optimal condition presentation processor 314 may also perform a process to cause the display device 12 to display the graphs illustrated in FIGS. 20A and 20B.

The optimal condition presentation process includes a process to prepare in advance a plurality of conditions regarding the feature point extraction process, or feature extraction conditions, and present a combination of conditions causing the largest number of corresponding points to be obtained by performing, using the feature points obtained by performing the feature point extraction process under the plurality of feature extraction conditions prepared in advance, the matching process between registered images and identification images obtained by acquiring the same under all the conditions generated through the brute-force condition generation process. This enables the user to easily find and set the optimal combination of the imaging equipment condition and the imaging target condition including the feature extraction condition.

The matching identification condition adjustment device 32 has a function to perform tuning of parameters of a matching identification algorithm to be used by the searching processor 261 and the matching processor 262 of the image matching/identification device 26. The matching identification condition adjustment device 32 has a function to adjust conditions, parameters, and the like to be used for the processes of the feature extraction device 22 and the image matching/identification device 26 automatically in response to the feedback from the image matching/identification device 26 or manually in response to an operation from a user and provide instructions regarding the conditions and the parameters to the feature extraction device 22 and the image matching/identification device 26. In the case of the present embodiment, the matching identification condition adjustment device 32 causes the matching processor 262 of the image matching/identification device 26 to perform matching using the evaluation image registered in the evaluation image register 242 of the recording device 24 and adjust the conditions and the parameters in accordance with a result of the matching, or the number of corresponding points in this case.

Figure 9:
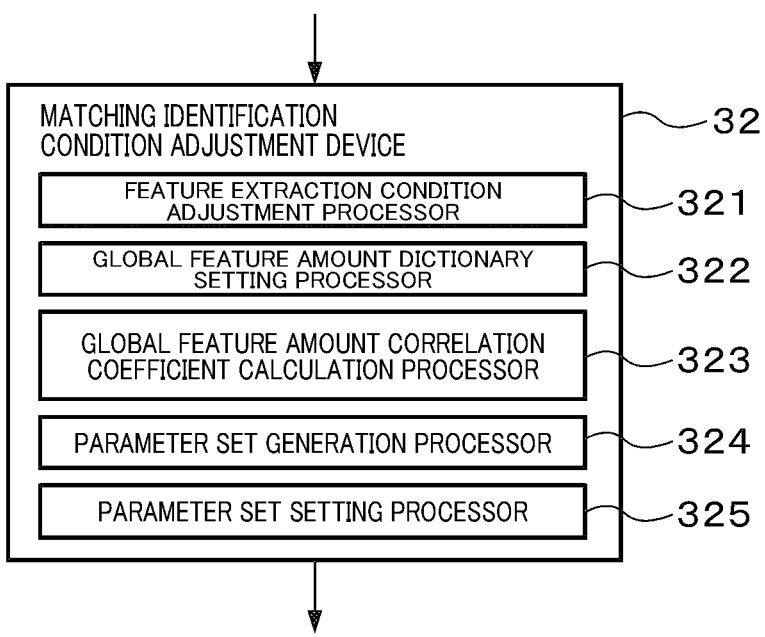
FIG. 9 is a block diagram illustrating an example of a schematic configuration of a matching identification condition adjustment device of the individual object identification system according to the embodiment.

The user can adjust the conditions and the parameters to be used by the feature extraction device 22 and the image matching/identification device 26 by, for example, operating the input device 11 to cause the matching identification condition adjustment device 32 to perform the process. As illustrated in FIG. 9, the matching identification condition adjustment device 32 includes a feature extraction condition adjustment processor 321, a global feature amount dictionary setting processor 322, a global feature amount correlation coefficient calculation processor 323, a parameter set generation processor 324, and a parameter set setting processor 325.

The feature extraction condition adjustment processor 321 is configured to perform a feature extraction condition adjustment process. The feature extraction condition adjustment process includes a process to adjust the feature extraction condition to be used for the feature point extraction process of the feature point extraction processor 221 or the local feature amount calculation process of the local feature amount calculation processor 222. The user can adjust and set the feature extraction condition such as the number of steps of a pyramided image in extracting a feature point and calculating a local feature amount and a threshold for determining similarity to a corner or a curve by operating the input device 11.

Figure 18A:
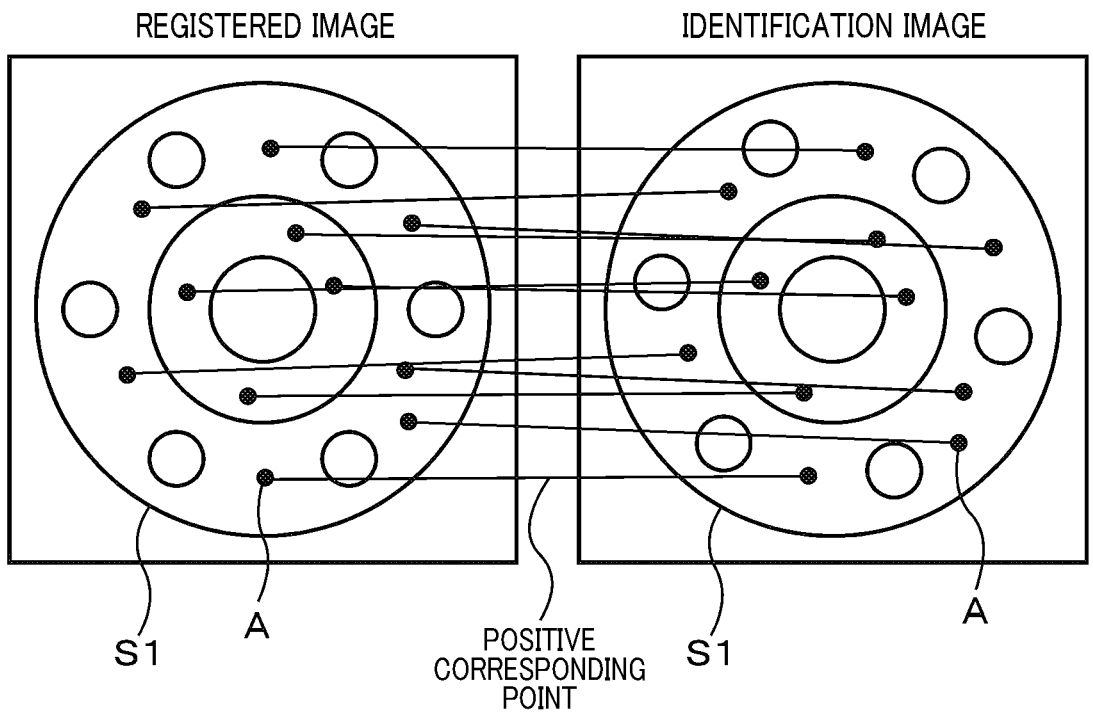
FIGS. 18A and 18B are diagrams schematically illustrating an example of the number of positive corresponding points and the number of negative corresponding points in the individual object identification system according to the embodiment.

The feature extraction condition adjustment process includes a process to adjust, based on a result of the matching process of the matching processor 262 of the image matching/identification device 26, the feature extraction condition of the local feature amount calculation process such that a ratio between the number of positive corresponding points and the number of negative corresponding points is maximized. In the present embodiment, the positive corresponding point refers to a corresponding point between, within the registered image group registered in the evaluation image register 242 of the recording device 24, a registered image obtained by acquiring the same subject as a subject of an identification image and the identification images as illustrated in FIG. 18A. Moreover, the number of positive corresponding points refers to the counts of positive corresponding points. In an example in FIG. 18A, a subject S1 appearing in the registered image and another subject S1 appearing in the identification image are the same.

Figure 18B:
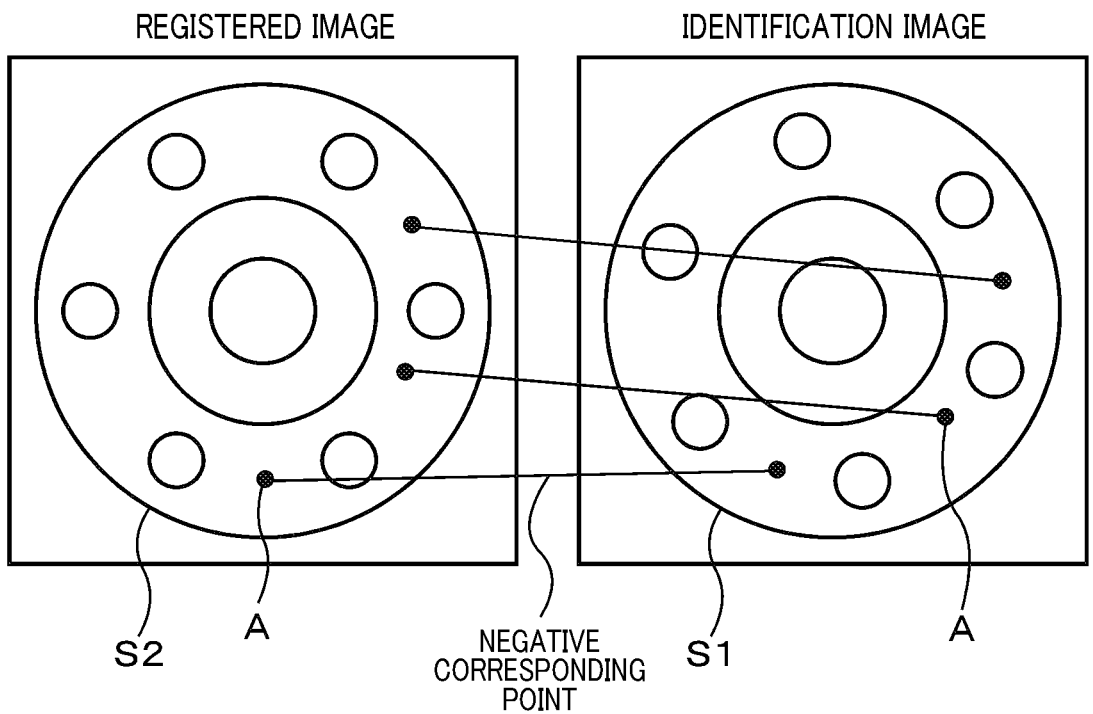

In addition, the negative corresponding point refers to a corresponding point between, within the registered image group registered in the evaluation image register 242 of the recording device 24, a registered image obtained by acquiring a subject different from a subject of an identification image and the identification image as illustrated in FIG. 18B. Moreover, the number of negative corresponding points refers to the counts of negative corresponding points. In an example in FIG. 18B, a subject S2 appearing in the registered image is different from the subject S1 appearing in the identification image.

The global feature amount dictionary setting processor 322 is configured to perform a global feature amount dictionary setting process. The global feature amount dictionary setting process includes a process to calculate a score for each global feature amount calculation statistical information and automatically set the information having a high score as the global feature amount dictionary to be used for the local feature amount group classification process of the local feature amount group classification processor 223. The global feature amount calculation statistical information refers to statistical information obtainable in the course of calculation of a global feature amount through the global feature amount calculation process, i.e., in the course of the local feature amount group classification process of the local feature amount group classification processor 223, and that can be expressed in a score of the amount of statistics of a histogram or a correlation value obtained by voting dictionary information highly correlated with the local feature amount. The dictionary information having a high score according to the statistical information such as a frequency for specific dictionary information to be selected is supposed to exhibit a high performance. By virtue of the global feature amount dictionary setting process, it is possible to automatically select the global feature amount dictionary containing such high-performance dictionary information.

The global feature amount dictionary setting process includes a process to: select, from among the plurality of global feature amount dictionaries registered in the global feature amount dictionary register 245, the global feature amount dictionary that enables determining that a registered image and an identification image obtained by acquiring the same subject are the same and determining that a registered image and an identification image obtained by acquiring different subjects are not the same based on a global feature amount correlation coefficient; and set that global feature amount dictionary as the global feature amount dictionary to be used for the local feature amount group classification process.

The global feature amount correlation coefficient can serve as an index indicating a degree of coincidence between the global feature amounts of the registered image and the identification image, i.e., performance. A higher correlation in global feature amount between two images means that the same subject is more likely to be included in both images. Therefore, a high correlation in global feature amount between images obtained by acquiring the same subject means that the degree of coincidence of the global feature amounts of the images obtained by acquiring the same subject calculated using the global feature amount dictionary is high. It means that the global feature amount dictionary exhibits a high performance between the images obtained by acquiring the same subject.

In contrast, a lower correlation in global feature amount between two images means that subjects in both images are more likely to be different. Therefore, a low correlation in global feature amount between images obtained by acquiring different subjects means the degree of coincidence of the global feature amounts of the images obtained by acquiring the different subjects using the global feature amount dictionary calculated is low. It means that the global feature amount dictionary exhibits a high performance between the images obtained by acquiring the different subjects.

For example, the global feature amount dictionary setting process can calculate a global feature amount correlation coefficient as follows and determine the performance of a global feature amount dictionary based on the global feature amount correlation coefficient. That is to say, with the assumption that two global feature amounts are vectors V, the global feature amount dictionary setting process normalizes each of absolute values of the vectors to one to take an inner product thereof and determines similarity is high in a case where a value of the inner product is close to one, whereas determining that similarity is low in a case where the value of the inner product is close to minus one.

In this case, for example, a global feature amount vector Va of the two global feature amounts satisfies Expression (2) below, a normalized global feature amount vector Vb satisfies Expression (3) below, d is defined as a natural number. In this case, the normalized global feature amount vector Vb is represented by Expression (4) below using the global feature amount vector Va. Moreover, assuming that the global feature amount vector Va satisfies Expression (5) below, an absolute value of the global feature amount vector Va satisfies Expression (6) below.

[Math. 2]

$$Va \in \mathbb{R}^d \qquad (2)$$

$$Vb \in \mathbb{R}^d \qquad (3)$$

$$Vb = Va/|Va| \qquad (4)$$

$$Va = [Va_1, Va_2, Va_3 \ldots Va_d]^T \qquad (5)$$

$$|Va|^2 = \sum_{i=1}^{d} Va_i^2 \qquad (6)$$

Moreover, assuming that the other global feature amount vector Wa of the two global feature amounts satisfies (7) Expression below, a value of the inner product satisfies (8) Expression below. Moreover, the global feature amount dictionary register 245 determines that similarity is high, i.e., the subjects are highly likely to be the same, in a case where the value of the inner product obtained by (8) Expression, i.e., the global feature amount correlation coefficient, is close to one, whereas determining that similarity is low, i.e., the subjects are unlikely to be the same, in a case where the value of the inner product is close to minus one.

[Math. 3]

$$Wa \in \mathbb{R}^d \qquad (7)$$

$$Vb \cdot Wb = \sum_{i=1}^{d} Vbi \cdot Wbi \qquad (8)$$

In addition, for example, the global feature amount dictionary setting process can calculate a global feature amount correlation coefficient as follows and determine the performance of a global feature amount dictionary based on the global feature amount correlation coefficient. That is to say, the global feature amount correlation coefficient is assumed to be a value of a distance between vectors of two global feature amounts. The global feature amount dictionary setting process then determines that similarity is high in a case where the value of the distance of the vectors of the two global feature amounts, or global feature amount correlation coefficient, is close to zero, whereas determining that similarity is low in a case where the value is large.

In this case, for example, assuming that the global feature amount vector Va of the two satisfies Expression (2) and Expressions (5) above, whereas the other global feature amount vector Wa, satisfies Expression (7) above and Expression (9) below, a distance between the global feature amount vectors Va, Wa is represented by Expression below.

[Math. 4]

$$Wa = [Wa_1, Wa_2, Wa_3 \ldots Wa_d]^T \qquad (9)$$

$$|Va - Wa|^2 = \sum_{i=1}^{d} (Va_i - Wa_i)^2 \qquad (10)$$

Moreover, the global feature amount dictionary register 245 determines that similarity is high, i.e., the subjects are highly likely to be the same, in a case where the distance between the vectors Va, Wa obtained by Expression (12) is small, or close to zero, whereas determining that similarity is low, i.e., the subjects are unlikely to be the same, in a case where the distance between the vectors Va, Wa is large. It should be noted that each of the vectors Va, Wa at this time is not necessarily normalized.

The global feature amount correlation coefficient calculation processor 323 is configured to perform a global feature amount correlation coefficient calculation process. The global feature amount correlation coefficient calculation process includes a process to compare the global feature amount of each of the registered images and the global feature amount of the identification image and calculate a global feature amount correlation coefficient indicating a correlation therebetween. For example, the global feature amount correlation coefficient calculation process can compare histograms of the global feature amount of each of the registered images and the global feature amount of the identification image and calculate the global feature amount correlation coefficient.

The parameter set generation processor 324 is configured to perform a parameter set generation process. For example, as illustrated in FIG. 17, the parameter set generation process includes a process to generate, for parameters for setting the condition for the matching process to be performed by the matching processor 262 of the image matching/identification device 26, a plurality of parameter sets by combining the parameters, which are set at set values within setting ranges defined for the respective parameters. In the case of the present embodiment, the parameter set generation process generates parameter sets for all the combinations of respective set values of the parameters.

The parameter set setting processor 325 is configured to perform a parameter set setting process. The parameter set setting process includes a process to set a parameter set to be used for the searching process of the searching processor 261 based on a user operation. A user can set the parameter set to be set for the searching process of the searching processor 261 by, for example, operating the input device 11.

Figure 10:
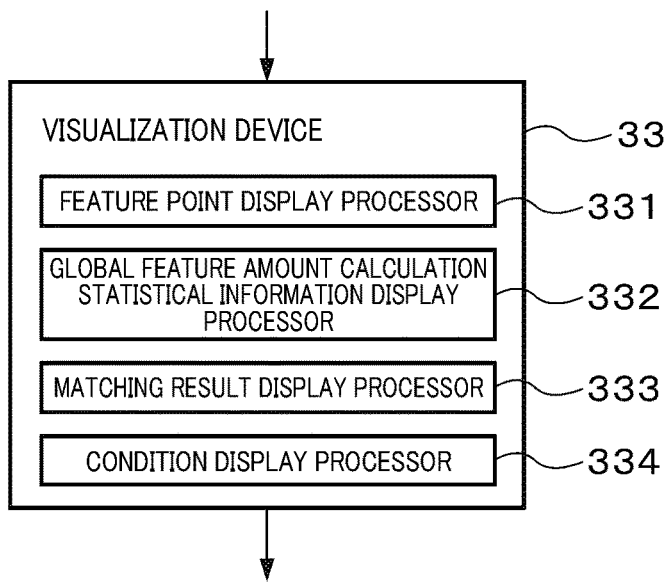
FIG. 10 is a block diagram illustrating an example of a schematic configuration of a visualization device of the individual object identification system according to the embodiment.

The visualization device 33 has a function to visualize a variety of information, such as information received from the image matching/identification device 26 and information regarding results of adjustment of the imaging condition adjustment device 31 and the matching identification condition adjustment device 32. and cause the display device 12 to display the information. Visualization in the present embodiment includes causing the display device 12 to display data in the forms of not only character and numerical value but also diagram, graph, and the like. The visualization device 33 includes a feature point display processor 331, a global feature amount calculation statistical information display processor 332, a matching result display processor 333, and a condition display processor 334 as illustrated in FIG. 10.

Figure 21A:
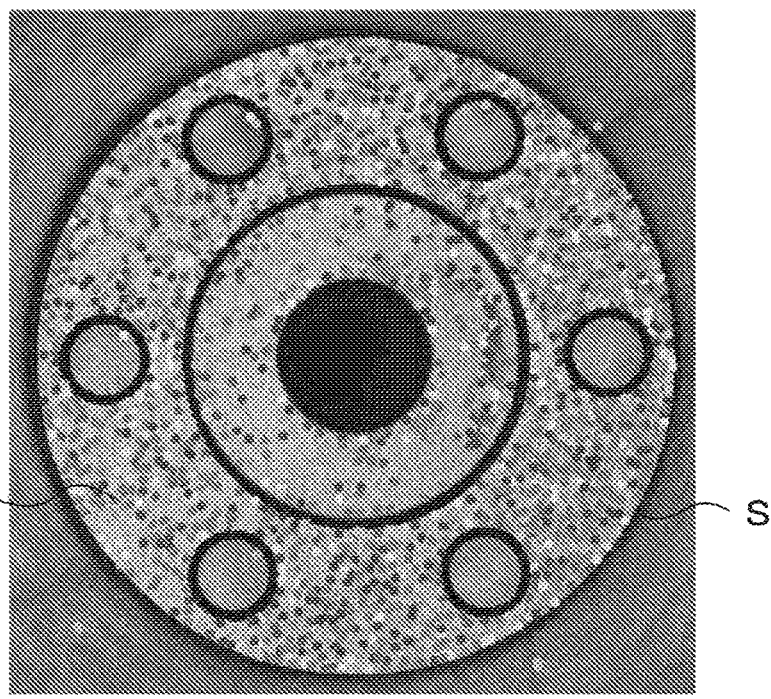
FIGS. 21A and 21B are diagrams illustrating an example of a displayed content to be displayed on a display device by a feature point display process in the individual object identification system according to the embodiment.
Figure 21B:
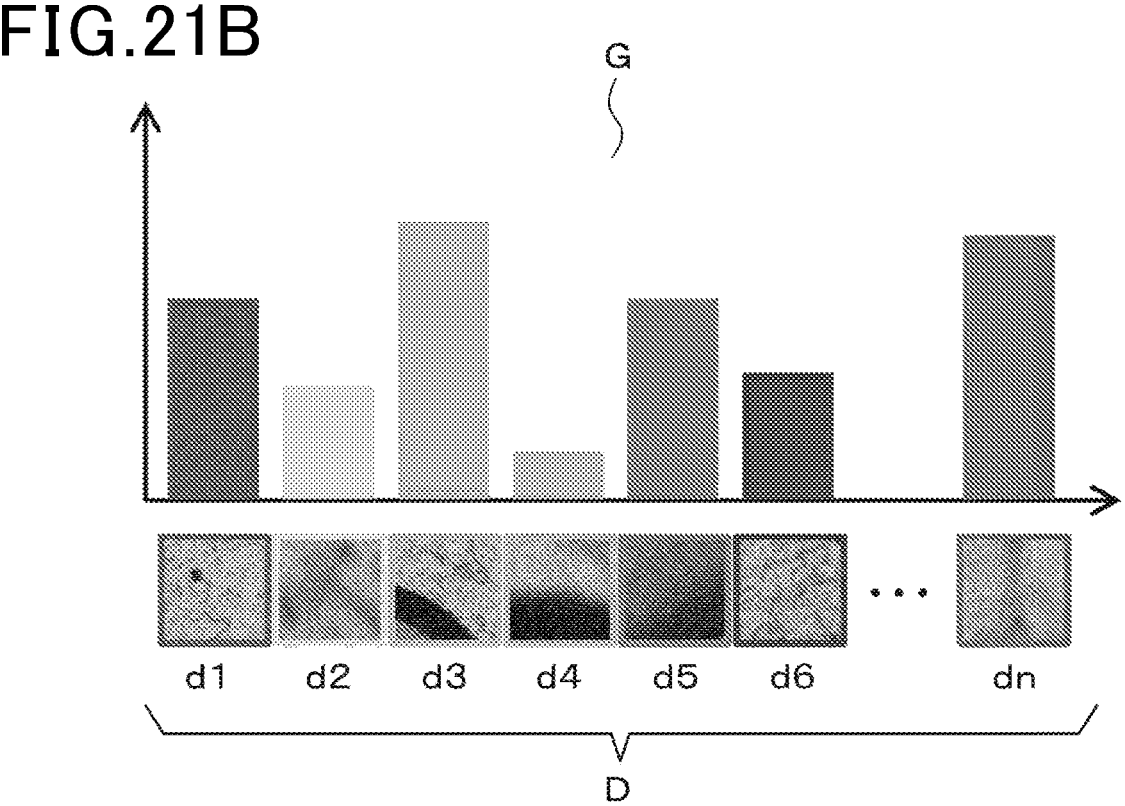

The feature point display processor 331 is configured to perform a feature point display process. The feature point display process can be performed when a variety of conditions and parameters are to be adjusted by the imaging condition adjustment device 31 and the matching identification condition adjustment device 32. For example, as illustrated in FIG. 21A, the feature point display process includes a process to cause the display device 12 to display the feature points P, which are extracted through the feature point extraction process of the feature point extraction processor 221 of the feature extraction device 22, in superimposition with an image. That is to say, the feature points P are displayed in superimposition with the subject S in the image. This enables the user to see which parts of the subject S in the image are extracted as the feature points. In addition, as illustrated in FIG. 21A, the feature point display process includes a process to cause the display device 12 to display the feature points P in a different manner, e.g., different color, size, or shape, for each of the local feature amount groups to which the local feature amounts belong, in this case, for each piece of dictionary information d where the feature points P are clustered and applied. In FIGS. 21A and 21B, a difference in color between the feature points P is expressed as a difference in shading.

The global feature amount calculation statistical information display processor 332 is configured to perform a global feature amount calculation statistical information display process. The global feature amount calculation statistical information display process can be performed when a variety of conditions and parameters are to be adjusted by the imaging condition adjustment device 31 and the matching identification condition adjustment device 32. The global feature amount calculation statistical information display process includes a process to cause the display device 12 to display global feature amount calculation statistical information. The global feature amount calculation statistical information is statistical information obtainable in the course of calculation of a global feature amount through the global feature amount calculation process performed by the global feature amount calculation processor 224 of the feature extraction device 22. As illustrated in FIG. 21B, the global feature amount calculation statistical information display process includes a process to cause the display device 12 to display, as global feature amount calculation statistical information G, the score of the amount of statistics of a histogram or a correlation value obtained by voting for the piece of dictionary information d highly correlated with each of the local feature amounts A. That is to say, the global feature amount calculation statistical information G can be the score of the amount of statistics of the histogram or the correlation value of a global feature amount obtainable in the course of performing the global feature amount calculation process.

The matching result display processor 333 is configured to perform a matching result display process. The matching result display process can be performed when a variety of conditions and parameters are to be adjusted by the imaging condition adjustment device 31 and the matching identification condition adjustment device 32. The matching result display process includes a process to collectively visualize a plurality of results of the matching process performed by the matching processor 262 of the image matching/identification device 26 and cause the display device 12 to display the results.

Figure 22:
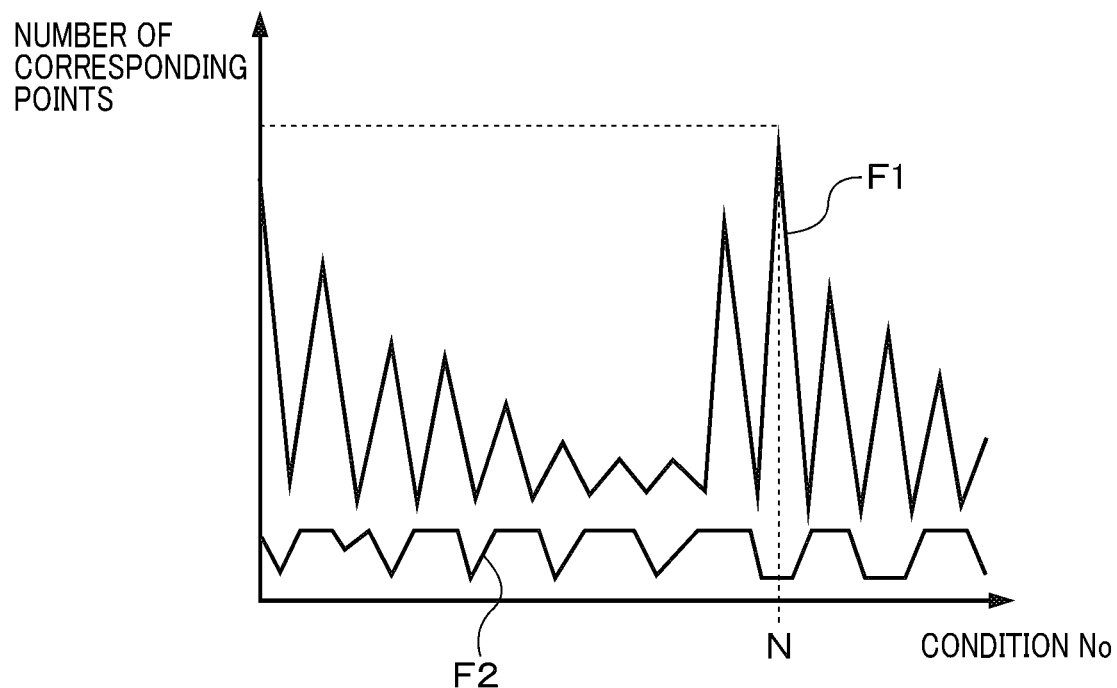
FIG. 22 is a first diagram illustrating an example of a displayed content to be displayed on the display device by a matching result display process in the individual object identification system according to the embodiment.

The matching result display process includes a process to graph and display a matching result of performing the matching process using, for example, the parameter sets illustrated in FIG. 17 as illustrated in FIG. 22. In this case, the matching result display processor 333 performs the matching process not only between images of the same subject but also between images of different subjects. The matching result display processor 333 then separately calculates and graphs the number of corresponding points between the images obtained by acquiring the same subject, namely, the number of positive corresponding points, and the number of corresponding points between the images obtained by acquiring the different subjects, namely, the number of negative corresponding points, and causes the display device 12 to display the numbers. In a graph in FIG. 22, a condition No is plotted on an abscissa axis and the number of corresponding points is plotted on an ordinate axis. In addition, in FIG. 22, F1 represents a graph of the number of positive corresponding points and F2 represents a graph of the number of negative corresponding points. In an example in FIG. 22, it is found that a condition No. N provides the largest number of positive corresponding points and the smallest number of negative corresponding points. The user can thus understand at first glance a condition No providing a large number of positive corresponding points and a small number of negative corresponding points, i.e., a condition No providing an excellent performance.

The matching result display process also includes a process to cause the display device 12 to display, when the matching process is performed by the matching processor 262 of the image matching/identification device 26, number-of-corresponding-point evaluation information regarding the identification image used for the matching. The number-of-corresponding-point evaluation information, which is information based on the number of corresponding points calculated through the matching process, may be provided as, for example, a numerical value of the number of corresponding points without a change or, for example, a level in a plurality of stages or a score.

Figure 23:
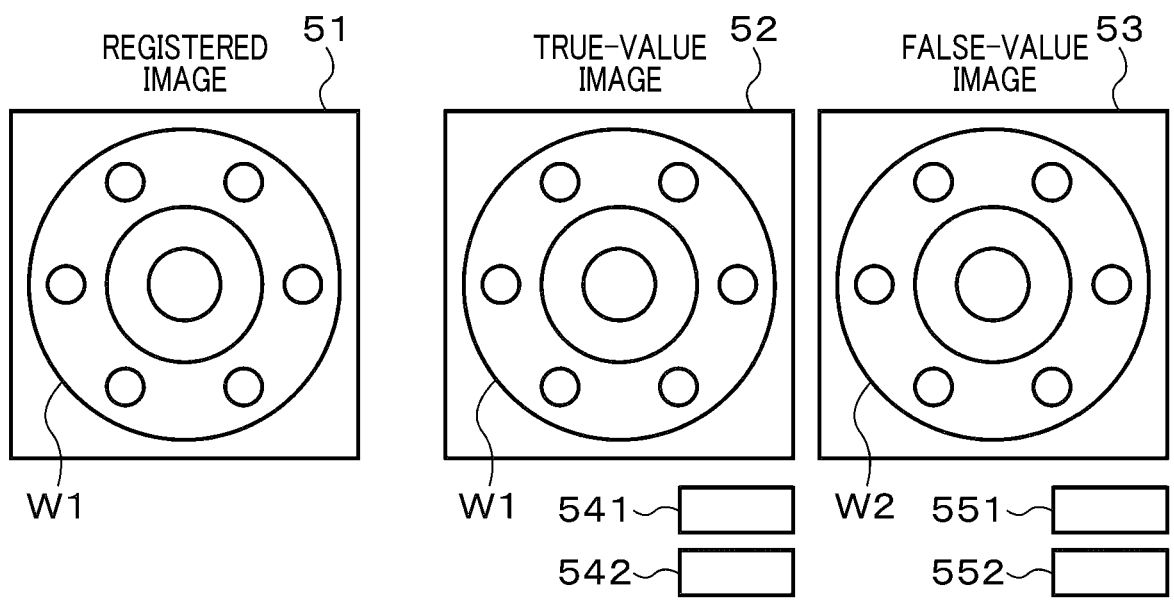
FIG. 23 is a second diagram illustrating an example of the displayed content to be displayed on the display device by the matching result display process in the individual object identification system according to the embodiment.

In this case, the matching result display processor 333 causes a registered image display 51, a true-value-image display region 52, a false-value-image display region 53, a true-value-image evaluation information display region 541, a true-value-image correlation information display region 542, a false-value-image evaluation information display region 551, and a false-value-image correlation image display region 552 to be displayed on a screen of the display device 12, for example, as illustrated in FIG. 23. Among images to be subjected to the matching process, one of the registered image groups registered in the evaluation image register 242 of the recording device 24 is displayed in the registered image display 51.

Among the images to be subjected to the matching process, the identification image registered in the evaluation image register 242 of the recording device 24 and obtained by acquiring the same subject as the subject of the image displayed in the registered image display 51 under a different condition is displayed in the true-value-image display region 52. In an example in FIG. 23, the subject S1 of the image displayed in the registered image display 51 and the subject S1 of the image displayed in the true-value-image display region 52 are the same individual object. In the present embodiment, an image obtained by acquiring the same subject as the subject of an image displayed in the registered image display 51 under a different condition is referred to as a true-value image. In this case, the registered image and the identification image obtained by acquiring the same subject are registered in association with each other, or in a pair, in the evaluation image register 242. That is to say, by virtue of identifying an association between the registered image and the identification image, the matching result display processor 333 can recognize whether they are obtained by acquiring the same subject or different subjects.

Moreover, among the images to be subjected to the matching process, the identification image registered in the evaluation image register 242 of the recording device 24 and obtained by acquiring a subject different from the subject of the image displayed in the registered image display 51 under a different condition is displayed in the false-value-image display region 53. In the example in FIG. 23, the subject S1 of the image displayed in the registered image display 51 and the subject S2 of the image displayed in the true-value-image display region 52 are different individual objects. In the present embodiment, an image obtained by acquiring a subject different from the subject of an image displayed in the registered image display 51 is referred to as the false-value image.

In addition, a result of performing the matching process between the image displayed in the registered image display 51 and the image displayed in the true-value-image display region 52, i.e., number-of-corresponding-point evaluation information regarding the true-value image, is displayed in the true-value-image evaluation information display region 541. In addition, a result of performing the matching process between the image displayed in the registered image display 51 and the image displayed in the false-value-image display region 53, i.e., number-of-corresponding-point evaluation information regarding a false-value image, is displayed in the false-value-image evaluation information display region 551.

The matching result display process includes a process to cause the display device 12 to display information based on the global feature amount correlation coefficient. In this case, a correlation coefficient between a global feature amount calculated from the registered image displayed in the registered image display 51 and a global feature amount calculated from the true-value image displayed in the true-value-image display region 52 is displayed in the true-value-image correlation information display region 542. Moreover, a correlation coefficient obtained by comparing the global feature amount calculated from the registered image displayed in the registered image display 51 and a global feature amount calculated from the false-value image displayed in the false-value-image display region 53 is displayed in the false-value-image correlation information display region 552.

A user operates, for example, the input device 11, thereby selecting images to be displayed in the registered image display 51, the true-value-image display region 52, the false-value-image display region 53, and the true-value-image evaluation information display region 541, i.e., images to be subjected to the matching process, and performing the matching process for those images. Then, after the matching process is performed, the matching result display processor 333 causes, as a result of the matching, number-of-corresponding-point evaluation information to be displayed in the respective true-value-image evaluation information display region 541 and false-value-image evaluation information display region 551 and causes global feature amount correlation coefficients to be displayed in the respective true-value-image correlation information display region 542 and false-value-image correlation information display region 552. This enables the user to check a variety of conditions and the performance of a parameter used for the matching process by looking at the number-of-corresponding-point evaluation information displayed in the true-value-image evaluation information display region 541 and the false-value image-evaluation information display region 551 and information based on the global feature amount correlation coefficients displayed in the true-value-image correlation information display region 542 and the false-value-image correlation information display region 552. In this case, the information based on the global feature amount correlation coefficient may be a value of the global feature amount correlation coefficient itself or may be a level, a rank, or the like determined by processing the global feature amount correlation coefficient to express the performance in several stages.

For example, as illustrated in FIG. 18, the matching result display processor 333 may cause the display device 12 to display the number of positive corresponding points or the number of negative corresponding points between the registered image and the identification image. In addition, for example, the matching result display processor 333 may cause unique feature points of the individual registered image and identification image and feature points common thereto to be displayed in a separate manner. In this case, the matching result display processor 333 may cause respective numbers or ratios of the unique feature points of the individual images and the feature points common thereto to be displayed. Moreover, the matching result display processor 333 may switch between a mode where only the registered image and the identification image are displayed, for example, a mode where the feature points are displayed in addition to the registered image and the identification image, and a mode where the feature points and the corresponding points are displayed in addition to the display registered image and the identification image, if necessary.

Here, components manufactured by the same process, such as industrial products, have a significantly small difference in feature among individual objects as compared with biometric identification using a face, fingerprint, or the like of a person. Therefore, it is necessary to perform matching between a large number of features seen on surfaces of the individual objects, so the identification requires time due to an increase in the amount of calculation and, further, the amount of calculation inevitably explosively increases with an increase in the number of parameters of targets to be identified.

Accordingly, the individual object identification system 1 includes the image acquisition processor 212, the feature point extraction processor 221, the local feature amount calculation processor 222, the local feature amount group classification processor 223, the searching target image registration processor 231, the global feature amount registration processor 234, the narrowing processor 2611, and the determination processor 2612. The image acquisition processor 212 is configured to perform the image acquisition process to acquire an image of a subject acquired using the imaging equipment 10. The feature point extraction processor 221 is configured to perform the feature point extraction process to extract a feature point from the image acquired through the image acquisition process. The local feature amount calculation processor 222 is configured to perform the local feature amount calculation process to calculate the local feature amount of the feature point extracted through the feature point extraction process.

The local feature amount group classification processor 223 is configured to perform the local feature amount group classification process to classify a plurality of local feature amounts obtained through the local feature amount calculation process into a predetermined number of, for example, 64, local feature amount groups in accordance with values of the local feature amounts. The global feature amount calculation processor 224 is configured to perform the global feature amount calculation process to calculate a global feature amount based on each of the local feature amount groups. The searching target image registration processor 231 is configured to perform the searching target image registration process to register, as registered images, a plurality of images that are searching targets in the searching target image register 241 in advance. The global feature amount registration processor 234 is configured to perform the global feature amount registration process to register the global feature amount related to each of the registered images in the global feature amount registration unit 244. For example, as illustrated in FIG. 15, the narrowing processor 2611 is configured to perform the narrowing process to narrow down the plurality of registered images to a predetermined number of registered images with global feature amounts highly correlated with the global feature amount of the identification image as candidates. Then, for example, as illustrated in FIG. 16, the determination processor 2612 is configured to perform the determination process to compare the local feature amounts of the candidate registered images extracted through the narrowing process with the local feature amount of the identification image and determine the registered image with the largest number of corresponding points of the local feature amount.

In this configuration, the narrowing processor 2611 performs the narrowing process, comparing the global feature amounts of the registered image and the identification image to roughly narrow down the registered images as candidates. The narrowing process can be performed at a much higher speed by virtue of a smaller amount of calculation than the determination process including comparing all the respective local feature amounts of the images but is unlikely to be accurate. Accordingly, the determination processor 2612 subsequently performs the determination process, comparing the local feature amounts of the registered images narrowed down as candidates and the identification image to determine a target. The determination process is excellent in accuracy, although taking a longer time due to a larger amount of calculation than the narrowing process including comparing the global feature amounts. Therefore, by virtue of performing a two-stage process including the narrowing process to perform narrowing in accordance with the global feature amounts and the determination process to perform determination in accordance with the local feature amounts, the individual object identification system 1 enables a high-speed search with a high accuracy. This exercises an effect especially in a case where the parameters of the registered images are increased.

Moreover, the individual object identification system 1 further includes at least one of the imaging equipment condition adjustment processor 311, the imaging target condition adjustment processor 312, and the feature extraction condition adjustment processor 321. The imaging equipment condition adjustment processor 311 is configured to perform the imaging equipment condition adjustment process to adjust a condition regarding the imaging equipment 10, or imaging equipment condition, based on a user operation. The imaging target condition adjustment processor 312 is configured to perform the imaging target condition adjustment process to adjust imaging target condition which is a condition regarding an imaging target, based on a user operation. Moreover, the feature extraction condition adjustment processor 321 is configured to perform the feature extraction condition adjustment process to adjust a condition regarding the feature point extraction process, or feature extraction condition, based on a user operation.

This enables a user to set a variety of conditions and parameters, i.e., perform tuning, by operating at least one of the imaging equipment condition adjustment processor 311, the imaging target condition adjustment processor 312, and the feature extraction condition adjustment processor 321. As a result, even in a case where, for example, machining that causes a change in the surface pattern during a manufacturing process is applied, i.e., a surface pattern is changed between when an image is registered and when the image is identified, a flexible adaptation to the change is allowed to perform identification at a high speed with a high accuracy.

The individual object identification system 1 includes the global feature amount dictionary generation processor 251. The global feature amount dictionary generation processor 251 is configured to perform the global feature amount dictionary generation process to generate a global feature amount dictionary including the respective representative values of local feature amount groups obtained from a plurality of images for learning acquired in advance. Moreover, the global feature amount calculation process includes the process to calculate, as the global feature amount, a histogram obtained by voting dictionary information highly correlated with each of the local feature amounts. In addition, the global feature amount calculation process may include a process to calculate a vector that is the sum of the difference vectors between each local feature amount and the representative value, which is the dictionary information with high correlation, by the number of representative values, and to calculate the vector that connects them as the global feature amount.

That is to say, since a spot to be extracted as a feature point varies with the type or state of a subject, in a case where the local feature amounts obtained from images are merely classified to calculate a global feature amount, the performance of the global feature amount is likely to be low, i.e., an identification capability is likely to be low. In contrast, according to the present configuration, the use of the global feature amount dictionary including dictionary information suitable for a subject enables a high-performance global feature amount to be obtained irrespective of a change in the type or state of a subject, thus enabling increasing the accuracy of the narrowing process.

In addition, in the present configuration, the global feature amount dictionary generation process includes the process to set the centroid of a local feature amount group as a representative value in the dictionary information. The centroid of a local feature amount group is representative of the local feature amount group. Thus, the centroid of the local feature amount group is set as a representative value in the dictionary information, which makes it possible to obtain a high-performance global feature amount dictionary.

The individual object identification system 1 includes the image acquisition processor 212 and the feature point extraction processor 221 and further includes the feature point display processor 331. For example, as illustrated in FIGS. 21A and 21B, the feature point display processor 331 is configured to perform the feature point display process to cause the display device 12 to display a feature point extracted through the feature point extraction process in superimposition with the image.

The individual object identification system 1 includes at least one of the imaging equipment condition adjustment processor 311, the imaging target condition adjustment processor 312, and the feature extraction condition adjustment processor 321. The imaging equipment condition adjustment processor 311 is configured to perform the imaging equipment condition adjustment process to adjust a condition regarding the imaging equipment 10, or imaging equipment condition, based on a user operation. The imaging target condition adjustment processor 312 is configured to perform the imaging target condition adjustment process to adjust imaging target condition which is a condition regarding an imaging target, based on a user operation. Moreover, the feature extraction condition adjustment processor 321 is configured to perform the feature extraction condition adjustment process to adjust a condition regarding the feature point extraction process, or feature extraction condition, based on a user operation.

For example, in a case where the individual object identification system 1 is used at a production site, some components to be identified undergo a change in coloration or the like of surface patterns thereof due to temporal change, heat machining, or the like during a manufacturing process. Regarding such components to be subjected to a machining that causes a change in tone or the like of surface patterns thereof during the manufacturing process, the positions and number of extracted feature points and local feature amounts are likely to significantly change before and after the machining, i.e., between when the image is registered and when the image is identified, which results in a lowered identification accuracy.

In contrast, according to the present configuration, a feature point extracted through the feature point extraction process is displayed on the display device 12 in superimposition with the image, enabling a user to visually check which spot in the image is extracted as the feature point. Then, the user operates at least one of the feature extraction condition adjustment processor 321, the imaging target condition adjustment processor 312, and the feature extraction condition adjustment processor 321 so that a feature point can be extracted with a focus on a spot where the tone or the like of the surface pattern is unlikely to change even after the manufacturing process, thereby being able to set a variety of conditions and parameters, or perform tuning, while checking the position of the extracted feature point. As a result, even in a case where a machining that causes a change in the surface pattern during the manufacturing process is to be performed, i.e., a surface pattern is to change between when the image is registered and when the image is identified, identification can be performed with a high accuracy.

The individual object identification system 1 includes the local feature amount calculation processor 222 and the local feature amount group classification processor 223. Moreover, the feature point display process further includes the process to cause the display device 12 to display feature points in a different manner for each of the local feature amount groups to which the local feature amounts belong, for example, in a different color, size, or shape as illustrated in FIG. 21A.

This enables a user to understand at a first glance where and what sort of feature point exists in the image. Thus, a work of setting a variety of conditions and parameters while checking the position of an extracted feature point is further facilitated. As a result, a component subjected to a machining that causes a change in the surface pattern during the manufacturing process can be identified with a higher accuracy.

The individual object identification system 1 includes the global feature amount calculation processor 224 and further includes the global feature amount calculation statistical information display processor 332. As illustrated in FIG. 21B, the global feature amount calculation statistical information display processor 332 is configured to perform the global feature amount calculation statistical information display process to cause the display device 12 to display the global feature amount calculation statistical information G obtained in the course of the local feature amount group classification process in the course of calculating a global feature amount by performing the global feature amount dictionary generation process.

This enables a user to easily understand what sort of global feature amount is obtained. That is to say, by virtue of displaying information indicating which piece of dictionary information in the global feature amount dictionary is voted for, and how many votes it wins, a user can understand a bias in selection of the dictionary information contained in the global feature amount dictionary. This further facilitates a work of setting a variety of conditions and parameters regarding the global feature amount while looking at the displayed global feature amount calculation statistical information G. As a result, a component subjected to a machining that causes a change in the surface pattern during the manufacturing process can be identified with a higher accuracy.

The individual object identification system 1 further includes the global feature amount dictionary generation processor 251. The global feature amount dictionary generation processor 251 is configured to perform the global feature amount dictionary generation process to generate the global feature amount dictionary containing, as dictionary information, the respective representative values of the local feature amount groups obtained from the plurality of images for learning acquired in advance. Moreover, as illustrated in FIGS. 21A and 21B, the global feature amount calculation statistical information display process includes the process to cause the display device 12 to display, as the global feature amount calculation statistical information G, the score of the amount of statistics of a histogram or a relative value obtained by voting on the dictionary information d highly correlated with each of the local feature amounts in the course of calculation of the global feature amount as illustrated in FIGS. 13A-13C.

This enables a user to visually and intuitively understand the global feature amount. This further facilitates a work of setting a variety of conditions and parameters regarding the global feature amount while looking at the displayed global feature amount calculation statistical information G. As a result, a component subjected to a machining that causes a change in the surface pattern during the manufacturing process can be identified with a higher accuracy.

The individual object identification system 1 further includes the global feature amount dictionary setting processor 322. The global feature amount dictionary setting processor 322 is configured to perform the global feature amount dictionary setting process to calculate a score for each global feature amount calculation statistical information and automatically set the information having a high score as the global feature amount dictionary to be used for the local feature amount group classification process.

Such automatic setting as a suitable global feature amount dictionary eliminates the necessity for a user to manually set conditions and parameters every time. As a result, user-friendliness is improved.

In a case where the individual object identification system 1 with the present configuration is used in, for example, a factory, it is assumed that a registered image and an identification image are acquired at different places. In this case, an acquiring environment would significantly change between when the registered image is acquired and when the identification image is acquired due to disturbance caused by dust generated in the factory, lighting in the factory, natural light such as outside light, and surrounding noise. If so, it is of concern that the extracted feature point, the local feature amount, and the like vary and the identification performance is lowered.

Accordingly, the individual object identification system 1 with the present configuration includes the image acquisition processor 212, the feature point extraction processor 221, the local feature amount calculation processor 222, the imaging target condition adjustment processor 312, and the imaging equipment condition adjustment processor 311. This enables a user to adjust the imaging target condition and the imaging equipment condition suitably for the extraction of a feature point and calculation of a local feature amount by operating the imaging target condition adjustment processor 312 and the imaging equipment condition adjustment processor 311. By virtue of thus setting suitable conditions in accordance with a change in environment, an influence of disturbance can be reduced, allowing a pattern desired as a feature to be suitably surfaced. As a result, identification accuracy can be improved.

The individual object identification device 20 further includes the brute-force condition generation processor 313. The brute-force condition generation processor 313 is configured to perform the brute-force condition generation process to generate combinations of imaging target conditions within a preset range and imaging equipment conditions within a preset range by brute force. Moreover, the image acquisition process includes the process to automatically acquire images acquired under all the conditions generated through the brute-force condition generation process.

This enables a large number of images to be automatically acquired and obtained with the imaging target condition and the imaging equipment condition separately changed. Thus, in a case where an optimal combination of conditions is to be sought by separately changing the imaging target condition and the imaging equipment condition, it is not necessary to generate combinations of conditions by a user manual operation and take acquires. As a result, it is possible to reduce an effort of adjusting the imaging target condition and the imaging equipment condition. Moreover, since high-performance conditions can be easily set, an improvement in identification performance is also achievable.

The individual object identification device 20 further includes the optimal condition presentation processor 314. The optimal condition presentation processor 314 is configured to perform the optimal condition presentation process to present, as the optimal conditions, a combination of the imaging target condition and the imaging equipment condition that provides, among the registered images and the identification image acquired under all the conditions generated through the brute-force condition generation process, the registered image and the identification image obtained by acquiring the same subject and that have a large number of corresponding points therebetween. A user can thus easily acquire and set optimal conditions providing a large number of feature points and the effort of adjusting conditions of the imaging target condition and the imaging equipment condition can be further reduced. Moreover, since the optimal combination of the imaging target condition and the imaging equipment condition can be easily set, an improvement in identification performance is also achievable.

The optimal condition presentation process includes the process to prepare in advance a plurality of conditions regarding the feature point extraction process, or feature extraction conditions, and present a combination of conditions causing the largest number of corresponding points to be obtained by performing, using the feature points obtained by performing the feature point extraction process under the plurality of feature extraction conditions prepared in advance, matching between registered images and identification images obtained by acquiring the same subject under all the conditions generated through the brute-force condition generation process. This enables a user to easily acquire the optimal conditions among combinations of not only the conditions of the imaging target condition and the imaging equipment condition but also the feature extraction condition regarding the feature point extraction process. Thus, the effort of adjusting the imaging target condition, the imaging equipment condition, and the feature extraction condition can be further reduced. Moreover, since the optimal combination of the imaging target condition, the imaging equipment condition, and the feature extraction condition can be easily set, a further improvement in identification performance is also achievable.

For example, regarding a component of an industrial product, unlike the face and fingerprint of a person, a pattern seen on a surface thereof has various features depending on the type, material, or machining method of a target to be subjected to matching identification. Accordingly, it is necessary to suitably adjust parameters of an algorithm to be used for matching identification in accordance with the type of the target to be identified. However, since there are a large number of parameter items, it takes considerable effort and time for a user to manually search all the combinations thereof for an optimal combination.

Accordingly, the individual object identification system 1 includes the feature point extraction processor 221 and the local feature amount calculation processor 222. In addition, the individual object identification system 1 further includes the matching processor 262, the parameter set generation processor 324, and the parameter set setting processor 325. The matching processor 262 is configured to perform the matching process to compare the local feature amounts of the registered image and the identification image and acquire the number of corresponding points of the feature points to match the registered image and the identification image. The parameter set generation processor 324 is configured to perform the parameter set generation process to generate, for parameters for setting a condition for the matching process, a plurality of parameter sets by combining the parameters, which are set at set values within setting ranges defined for the respective parameters. The parameter set setting processor 325 is configured to perform the parameter set setting process to set the parameter set based on a user operation.

The matching process includes the process to perform the matching process using each of the parameter sets generated through the parameter set generation process. Moreover, the individual object identification system 1 further includes the matching result display processor 333. The matching result display processor 333 is configured to perform the matching result display process to cause the display device 12 to collectively display matching results of performing the matching process using each of the parameter sets.

Thus, combinations of parameters, or parameter sets, are automatically generated and the matching process is performed using each of the parameter sets. This eliminates the necessity for a user to manually create combinations of parameters to perform matching every time. Moreover, the matching results are collectively displayed on the display device 12. The user can thus check the performance of each of the parameter sets by looking at the results displayed on the display device 12. Then, the user only has to select a suitable parameter set by looking at the results displayed on the display device 12. This makes it possible to easily, effortlessly, and highly accurately adjust the parameters of the algorithm to be used for matching identification irrespective of the type of a target to be subjected to matching identification.

The matching result display process includes the process to graph and display the matching result of performing the matching process using each of the parameter sets as illustrated in FIG. 22. This makes it easy to visually and intuitively understand which is a highest-performance one of the plurality of parameter sets. A work of adjusting a parameter with a high accuracy can be easily performed.

The individual object identification system 1 further includes the image-for-evaluation registration processor 232. The image-for-evaluation registration processor 232 is configured to perform the image-for-evaluation registration process to register, as images for evaluation for the matching process, a registered image group including a plurality of registered images obtained by acquiring respective different subjects and an identification image obtained by acquiring the same subject as that of one among the registered image group under a different condition in association with each other in the evaluation image register 242.

This eliminates the necessity for a user to acquire an image every time when evaluating the parameter sets. As a result, the parameter sets can be easily evaluated. In addition, this causes the registered image and the identification image obtained by acquiring the same subject to be registered in association with each other. Thus, in performing the matching process using the registered image and the identification image, a correspondence relationship between the registered image and the identification image, i.e., whether they are obtained by acquiring the same subject or acquiring different subjects, is known in advance. Thus, by virtue of the use of the images the correspondence relationship of which is known, a result of the matching process wished to be obtained can be known, which makes it easy for a user to evaluate the parameter set used for the matching process.

That is to say, as long as the number of corresponding points is large as a result of the matching process being performed using the registered image and the identification image obtained by acquiring the same subject and the number of corresponding points is small as a result of the matching process being performed using the registered image and the identification image obtained by acquiring different subjects, a user can give a high evaluation to the performance of the parameter set used for the matching process. Conversely, as long as the number of corresponding points is small as a result of the matching process being performed using the registered image and the identification image obtained by acquiring the same subject or the number of corresponding points is small as a result of the matching process being performed using the registered image and the identification image obtained by acquiring the different subjects, a user can give a low evaluation to the performance of the parameter set used for the matching process.

The matching process includes the process to match one or more registered images contained in the registered image group with the identification image. Moreover, the matching result display process includes the process to cause the display device 12 to display the number-of-corresponding-point evaluation information based on the number of corresponding points calculated through the matching process as illustrated in FIG. 23. This enables a user to easily evaluate the performance of the parameter set by looking at the number-of-corresponding-point evaluation information displayed on the display device 12, thus being able to select a suitable parameter set in accordance with the type of a target to be subjected to matching identification. As a result, a high matching identification performance can be exhibited irrespective of the type of a target.

The individual object identification device 20 further includes the feature extraction condition adjustment processor 321. The feature extraction condition adjustment processor 321 is configured to perform the feature extraction condition adjustment process. The feature extraction condition adjustment process includes the process to calculate the number of positive corresponding points and the number of negative corresponding points, the number of positive corresponding points being the number of corresponding points between the registered image obtained by acquiring the same subject as that of the identification image among the registered image group and the identification image, the number of negative corresponding points being the number of corresponding points between the registered image obtained by acquiring a different subject from that of the identification image among the registered image group and the identification image. Moreover, the feature extraction condition adjustment process includes the process to adjust the feature extraction conditions of the local feature amount calculation process such that a ratio between the number of positive corresponding points and the number of negative corresponding points is maximized.

In this case, the feature extraction condition adjustment processor 321 searches for the feature extraction condition providing a large number of positive corresponding points and a small number of negative corresponding points so that the ratio between the number of positive corresponding points and the number of negative corresponding points is maximized. A large number of positive corresponding points means that the number of corresponding points between images obtained by acquiring the same subject is large. It means that the matching process between images obtained by acquiring the same subject allows for identifying that the subjects in the images are highly likely to be the same, i.e., exhibits a high performance in identification between images obtained by acquiring the same subject. In addition, a small number of negative corresponding points means that the number of corresponding points between images obtained by acquiring different subjects is small. It means that the matching process between images obtained by acquiring different subjects allows for identifying that the subjects in the images are highly likely to be the different, i.e., exhibits a high performance in identification between images obtained by acquiring different subjects.

Thus, the feature extraction condition adjustment processor 321 automatically adjusts the feature extraction condition such that a performance in matching identification between images obtained by acquiring the same subject and between images obtained by acquiring different subjects becomes high, which makes it possible to reduce the effort for a user to perform adjustment with a high matching identification performance being achieved.

The individual object identification system 1 includes the local feature amount group classification processor 223 and the global feature amount calculation processor 224. Moreover, the individual object identification system 1 further includes the global feature amount correlation coefficient calculation processor 323. The global feature amount correlation coefficient calculation processor 323 is configured to perform the global feature amount correlation coefficient calculation process to compare the global feature amount of each of the registered images with the global feature amount of the identification image and calculate the global feature amount correlation coefficient indicating a correlation therebetween. Moreover, the matching result display process includes the process to cause the display device 12 to display information based on the global feature amount correlation coefficient.

The global feature amount correlation coefficient serves as an index indicating the degree of coincidence of the global feature amounts of the registered image and the identification image, i.e., performance. With the information based on the global feature amount correlation coefficient being displayed on the display device 12, a user can easily understand the performance of the global feature amount. The user can thus perform adjustment work for a variety of conditions and parameters using the information based on the global feature amount correlation coefficient on the display device 12 as a guideline, which facilitates the work.

The individual object identification system 1 further includes the global feature amount dictionary register 245 and the global feature amount dictionary setting processor 322. The global feature amount dictionary setting processor 322 is configured to perform the global feature amount dictionary setting process. The global feature amount dictionary setting process includes the process to select, from among the plurality of global feature amount dictionaries registered in the global feature amount dictionary register 245, the global feature amount dictionary that allows the registered image and the identification image obtained by acquiring the same subject to be determined to be the same based on the global feature amount correlation coefficient and the registered image and the identification image obtained by acquiring different subjects to be determined not to be the same and set it as a global feature amount dictionary to be used for the local feature amount group classification process.

The global feature amount correlation coefficient serves as an index indicating the degree of coincidence of correlation in global feature amount between a registered image and an identification image as described above. A larger correlation in global feature amount between two images means that the same subject is more likely to be contained in both the images. Accordingly, a large correlation in global feature amount between images obtained by acquiring the same subject means that the degree of coincidence between the calculated global feature amounts of the two images obtained by acquiring the same subject is high. It means that the global feature amount dictionary exhibits a high performance between images obtained by acquiring the same subject.

In contrast, a smaller correlation in global feature amount between two images means that the subjects contained in the images are more likely to be different. Accordingly, a small correlation in global feature amount between images obtained by acquiring different subjects means that the degree of coincidence between the global feature amounts of the images obtained by acquiring different subjects calculated using the global feature amount dictionary is low. It means that the global feature amount dictionary exhibits a high performance between images obtained by acquiring different subjects.

In the present configuration, the global feature amount dictionary setting process enables automatically setting the global feature amount dictionary that exhibits a high performance between images obtained by acquiring the same subject and between images obtained by acquiring different subjects. Therefore, the effort of a user to perform adjustment can be saved and a high matching identification performance can be achieved.

The global feature amount dictionary setting process may include the process to normalize, with the assumption that two global feature amounts are vectors, each of absolute values of the vectors to one to take an inner product thereof and determine that similarity is high in a case where a value of the inner product is close to one, whereas determining that similarity is low in a case where the value of the inner product is close to minus one. In addition, the global feature amount correlation coefficient may be a value of a distance between the vectors of the two global feature amounts. In this case, the global feature amount dictionary setting process includes the process to determine that similarity is high in a case where the value of the distance of the vectors of the two global feature amounts is close to zero, whereas determining that similarity is low in a case where the value is large. These configurations enable the performance of the global feature amount dictionary to be quantitatively evaluated.

The individual object identification system 1 includes the individual object identification device 20 including the image acquisition processor 212, the feature point extraction processor 221, and the determination processor 2612. Moreover, the individual object identification system 1 includes at least two of the visualization device 33, the imaging condition adjustment device 31, and the matching identification condition adjustment device 32 in addition to the individual object identification device 20.

The visualization device 33 includes the feature point display processor 331. The feature point display processor 331 is configured to perform the feature point display process to cause the display device 12 to display a feature point extracted through the feature point extraction process in superimposition with the image.

The imaging condition adjustment device 31 causes the individual object identification device 20 to perform the matching process including comparing, among the plurality of registered images registered in advance, the registered image and the identification image obtained by acquiring the same subject in terms of local feature amount, acquiring the number of corresponding points of the feature points, and matching the registered image with the identification image and includes the imaging target condition adjustment processor 312 and the imaging condition adjustment device 31. The imaging target condition adjustment processor 312 is configured to perform the imaging target condition adjustment process to adjust the condition regarding the imaging target, or imaging target condition. The imaging equipment condition adjustment processor 311 is configured to perform the imaging equipment condition adjustment process to adjust the condition regarding imaging equipment 10, or imaging equipment condition.

The matching identification condition adjustment device 32 includes the parameter set generation processor 324 and the parameter set setting processor 325. The parameter set generation processor 324 is configured to perform the parameter set generation process to generate, for parameters for setting the condition for the matching process, the plurality of parameter sets by combining the parameters, which are set at set values within ranges defined for the respective parameters. The parameter set setting processor 325 is configured to perform the parameter set setting process to set the parameter set based on a user operation. Moreover, the matching identification condition adjustment device 32 then causes the matching processor 262 to perform a process to perform the matching process using each of the parameter sets generated through the parameter set generation process. Moreover, the matching identification condition adjustment device 32 further includes the matching result display processor 333 configured to perform the matching result display process to cause the display device 12 to collectively display matching results of the matching process using the parameter sets.

By virtue of the individual object identification system 1 including the visualization device 33, a feature point extracted through the feature point extraction process is displayed on the display device 12 in superimposition with the image, which enables a user to visually check which part in the image is extracted as the feature point. Moreover, the user can set a variety of conditions and parameters, i.e., perform tuning, while checking the position of the extracted feature point so that a feature point can be extracted with a focus on a spot where the tone or the like of the surface pattern is unlikely to change even during the manufacturing process. This results in an excellent effect; high-accuracy identification can be performed even in a case where a machining that causes a change in the surface pattern during the manufacturing process is to be performed, i.e., a surface pattern changes between when the image is registered and when the image is identified.

By virtue of the individual object identification system 1 including the imaging condition adjustment device 31, a user can adjust suitable imaging target condition and imaging equipment condition for extraction of a feature point and calculation of a local feature amount by operating the imaging target condition adjustment processor 312 and the imaging equipment condition adjustment processor 311. Thus, the suitable conditions are set in accordance with a change in the environment, which makes it possible to reduce an influence of disturbance to allow a feature, or pattern, to be suitably surfaced. This results in an excellent effect; identification accuracy is improved.

By virtue of the individual object identification system 1 including the matching identification condition adjustment device 32, it is not necessary for a user to manually create combinations of parameters and perform matching every time. Results of the matching are then collectively displayed on the display device 12. Thus, the user can check the performance of each of the parameter sets by looking at the results displayed on the display device 12. Then, the user only has to select the suitable parameter set by looking at the results displayed on the display device 12. This provides an excellent effect; the parameters of the algorithm to be used for matching identification can be easily, without hassle, and highly accurately adjusted irrespective of the type of a target to be subjected to matching identification.

Moreover, by virtue of the individual object identification system 1 including at least two of the visualization device 33, the imaging condition adjustment device 31, and the matching identification condition adjustment device 32, two or more of the respective excellent effects of the devices described above can be achieved at the same time. This enables addressing a change in the surface pattern of a target to be identified, making an influence of disturbance unlikely to be received, reducing the effort of the user to adjust conditions and parameters to enhance the accuracy of the conditions and the accuracy of the parameters, so that the performance of matching identification can be enhanced.

The individual object identification system 1 includes the visualization device 33, the imaging condition adjustment device 31, and the matching identification condition adjustment device 32. Thus, by virtue of including all of the visualization device 33, the imaging condition adjustment device 31, and the matching identification condition adjustment device 32 at the same time, all the respective excellent effects of the devices described above can be achieved at the same time. That is to say, the individual object identification system 1 is capable of addressing a change in the surface texture of a target to be identified, performing adjustment unlikely to be affected by disturbance, and even reducing the effort of the user to adjust conditions and parameters.

The searching processor 261 further includes the narrowing processor 2611 configured to perform the narrowing process. The narrowing process includes the process to narrow down the plurality of registered images registered in the searching target image register 241 to a predetermined number of registered images each having the global feature amount highly correlated with the global feature amount of the identification image as candidates for the determination process.

Thus, in the searching process, a two-stage process including the narrowing process to perform narrowing in accordance with the global feature amount and the determination process to perform determination in accordance with the local feature amount, is performed, thereby enabling a high-speed search. As a result, the individual object identification system 1 with the present configuration thus enables a high-speed search with a high matching identification performance.

Although the present disclosure is described with reference to examples, it should be understood that the present disclosure is not limited to the examples and structures. The present disclosure embraces various modifications examples and modifications within the range of equivalency. Additionally, various combinations and forms and, further, other combinations and forms including only a single element or more or less in addition thereto are also within the spirit and scope of the present disclosure.

A controller and a technique thereof according to the present disclosure may be implemented by a dedicated computer including a processor programed to execute one or a plurality of functions exemplified by a computer program and a memory. Alternatively, the controller and the technique thereof according to the present disclosure may be implemented by a dedicated computer including a processor including one or more dedicated hardware logic circuits. Further alternatively, the controller and the technique thereof according to the present disclosure may be implemented by one or more dedicated computers each including a combination of a processor programed to execute one or a plurality of functions, a memory, and a processor including one or more hardware logic circuits. In addition, the computer program may be stored as instructions to be executed by a computer in a computer-readable non-transition tangible recording medium.

What is claimed is:

1. An individual object identification system comprising:
an image acquisition processor configured to perform an image acquisition process to acquire an image of a subject acquired using imaging equipment;
a feature point extraction processor configured to perform a feature point extraction process to extract a feature point from the image acquired through the image acquisition process; a local feature amount calculation processor configured to perform a local feature amount calculation process to calculate a local feature amount of the feature point extracted through the feature point extraction process;
a local feature amount group classification processor configured to perform a local feature amount group classification process to classify a plurality of the local feature amounts obtained through the local feature amount calculation process into a predetermined number of local feature amount groups in accordance with values of the local feature amounts;
a global feature amount calculation processor configured to perform a global feature amount calculation process to calculate a global feature amount based on each of the local feature amount groups;
a searching target image registration processor configured to perform a searching target image registration process to register, as a registered image, each of a plurality of images that are searching targets in a searching target image register in advance;
a global feature amount registration processor configured to perform a global feature amount registration process to register the global feature amount related to the registered image in a global feature amount registration unit;
a narrowing processor configured to perform a narrowing process to narrow down a plurality of the registered images to a predetermined number of the registered images each having the global feature amount highly correlated with the global feature amount of the identification image as candidates;
a determination processor configured to perform a determination process to compare the local feature amounts of the registered images as the candidates extracted through the narrowing process with the local feature amount of the identification image and determine the registered image with the local feature amount having a largest number of corresponding points; and
at least one of an imaging equipment condition adjustment processor configured to perform an imaging equipment condition adjustment process to adjust a condition regarding the imaging equipment, or imaging equipment condition, based on a user operation, an imaging target condition adjustment processor configured to perform an imaging target condition adjustment process to adjust imaging target condition which is a condition regarding an imaging target, based on a user operation, and a feature extraction condition adjustment processor configured to perform a feature extraction condition adjustment process to adjust a condition regarding the feature point extraction process, or feature extraction condition, based on a user operation.

2. The individual object identification system according to claim 1, further comprising
a global feature amount dictionary generation processor configured to perform a global feature amount dictionary generation process to generate a global feature amount dictionary including, as dictionary information, a value of each of the local feature amount groups obtained from a plurality of images for learning acquired in advance,
the global feature amount calculation process including a process to calculate, as the global feature amount, a histogram obtained by voting on the dictionary information highly correlated with each of the local feature amounts.

3. The individual object identification system according to claim 1, further comprising
a global feature amount dictionary generation processor configured to perform a global feature amount dictionary generation process to generate a global feature amount dictionary including, as dictionary information, a value of each of the local feature amount groups obtained from a plurality of images for learning acquired in advance, the global feature amount calculation process including a process to calculate a vector that is the sum of the difference vectors between each local feature amount and the representative value, which is the dictionary information with high correlation, by the number of representative values, and to calculate the vector that connects them as the global feature amount.

4. The individual object identification system according to claim 1, wherein the global feature amount dictionary generation process includes a process to set a centroid of each of the local feature amount groups as the representative value in the dictionary information.

5. A non-transitory computer-readable storage medium storing an individual object identification program for implementing an individual object identification system configured to determine a registered image obtained by acquiring a same subject as a subject of an identification image from among a plurality of registered images, the individual object identification program including instructions that, when executed by a processor, configure the processor to perform:

an image acquisition process to acquire an image of a subject acquired using imaging equipment;

a feature point extraction process to extract a feature point from the image acquired through the image acquisition process;

a local feature amount calculation process to calculate a local feature amount of the feature point extracted through the feature point extraction process;

a local feature amount group classification process to classify a plurality of the local feature amounts obtained through the local feature amount calculation process into a predetermined number of local feature amount groups in accordance with values of the local feature amounts;

a global feature amount calculation process to calculate a global feature amount based on each of the local feature amount groups;

a searching target image registration process to register, as a registered image, each of a plurality of images that are searching targets in a searching target image register in advance;

a global feature amount registration process to register the global feature amount related to the registered image in a global feature amount registration unit;

a narrowing process to narrow down a plurality of the registered images to a predetermined number of the registered images each having the global feature amount highly correlated with the global feature amount of the identification image as candidates;

a determination process to compare the local feature amounts of the registered images as the candidates extracted through the narrowing process with the local feature amount of the identification image and determine the registered image with the local feature amount having a largest number of corresponding points; and at least one of an imaging equipment condition adjustment process to adjust a condition regarding the imaging equipment, or imaging equipment condition, based on a user operation, an imaging target condition adjustment process to adjust imaging target condition which is a condition regarding an imaging target, based on a user operation, and a feature extraction condition adjustment process to adjust a condition regarding the feature point extraction process, or feature extraction condition, based on a user operation.

* * * * *